US011461724B2

(12) United States Patent
Honda et al.

(10) Patent No.: US 11,461,724 B2
(45) Date of Patent: Oct. 4, 2022

(54) COMPUTER SYSTEM, PROGRAM, AND METHOD FOR PROVIDING ADVICE ON COMMUNICATION

(71) Applicant: KAKEAI, Inc., Tokyo (JP)

(72) Inventors: Hidetaka Honda, Tokyo (JP); Emi Minagawa, Tokyo (JP); Akira Koyasu, Tokyo (JP); Junya Kaneda, Tokyo (JP); Yoshio Ando, Tokyo (JP)

(73) Assignee: KAKEAI, Inc., Tokyo (JP)

( * ) Notice: Subject to any disclaimer, the term of this patent is extended or adjusted under 35 U.S.C. 154(b) by 3 days.

(21) Appl. No.: 17/251,812

(22) PCT Filed: May 20, 2019

(86) PCT No.: PCT/JP2019/019952
§ 371 (c)(1),
(2) Date: Dec. 13, 2020

(87) PCT Pub. No.: WO2019/239806
PCT Pub. Date: Dec. 19, 2019

(65) Prior Publication Data
US 2021/0192403 A1 Jun. 24, 2021

(30) Foreign Application Priority Data
Jun. 13, 2018 (JP) .............................. JP2018-112907

(51) Int. Cl.
*G06Q 10/06* (2012.01)
*G06Q 50/30* (2012.01)

(52) U.S. Cl.
CPC ......... *G06Q 10/0639* (2013.01); *G06Q 50/30* (2013.01)

(58) Field of Classification Search
CPC ........ G10L 15/22; G06Q 10/10; G06Q 10/06; G06Q 30/02; G06Q 50/30; G06F 3/0482; G06F 3/016; G06F 3/167; G06F 3/04842
See application file for complete search history.

(56) References Cited

U.S. PATENT DOCUMENTS

| 7,644,144 | B1 * | 1/2010 | Horvitz | G06Q 10/10 |
| | | | | 709/204 |
| 8,825,584 | B1 | 9/2014 | Miller et al. | |
| 2014/0372362 | A1 * | 12/2014 | Miller | G06F 16/23 |
| | | | | 706/50 |

(Continued)

FOREIGN PATENT DOCUMENTS

| AU | 2014101517 A4 * | 2/2015 |
| JP | 2000-47970 A | 2/2000 |

(Continued)

OTHER PUBLICATIONS

L. Zhou, "A Project Human Resource Allocation Method Based on Software Architecture and Social Network," 2008 4th International Conference on Wireless Comms., Networking and Mobile Computing, 2008, pp. 1-6, doi: 10.1109/WiCom.2008.1749. https://ieeexplore.ieee.org/stamp/stamp.jsp?tp=&arnumber=4679938 (Year: 2008).*

(Continued)

*Primary Examiner* — Jerry O'Connor
*Assistant Examiner* — Michael R Koester
(74) *Attorney, Agent, or Firm* — Renner, Otto, Boisselle & Sklar, LLP

(57) ABSTRACT

The present invention provides a computer system providing an advice on communication. The computer system (100) of the present invention is configured to receive characteristics of a plurality of users (S501), to mutually compare the characteristics of two users out of the plurality of users (S502), and output an advice on communication between the two users on the basis of the comparison of the characteristics of the two users (S503).

11 Claims, 17 Drawing Sheets

(56) References Cited

U.S. PATENT DOCUMENTS

| | | | |
|---|---|---|---|
| 2016/0189562 A1* | 6/2016 | Vaughan | G09B 19/00 |
| | | | 434/308 |
| 2017/0185942 A1* | 6/2017 | Hickson | G06Q 10/063118 |
| 2017/0236081 A1* | 8/2017 | Grady Smith | G06Q 10/0637 |
| | | | 705/7.36 |

FOREIGN PATENT DOCUMENTS

| | | |
|---|---|---|
| JP | 2003-281142 A | 10/2003 |
| JP | 2005-216324 A | 8/2005 |
| JP | 2007-60225 A | 3/2007 |
| JP | 201038645 A | 2/2010 |
| JP | 2011-008393 | 1/2011 |
| JP | 2014-10499 A | 1/2014 |
| JP | 2017-016343 | 1/2017 |
| JP | 2017-123123 A | 7/2017 |
| JP | 2017-211852 A | 11/2017 |
| JP | 2017-224256 A | 12/2017 |
| JP | 201810310 A | 1/2018 |
| WO | 2011/125272 A1 | 10/2011 |
| WO | 2011/125272 A1 | 7/2013 |
| WO | 2017/212783 A1 | 12/2017 |

OTHER PUBLICATIONS

International Search Report for related International Application No. PCT/JP2019/019952 dated Aug. 13, 2019 and is English translation.

Hideki Fukushima et al., konsarutanto no tame no saiguramu nyumon (Introduction to Psygram for Consultants 3), kigyoshindan (corporate diagnosis), Doyukan Inc., Aug. 1, 2007, vol. 54, No. 8, p. 140-143 and its Machine Translation.

Office Action issued for counterpart Japanese Application No. 2018-112907, issued by the Japanese Patent Office dated Jan. 17, 2019, and its English translation.

Office Action issued for counterpart Japanese Application No. 2019-47955, issued by the Japanese Patent Office dated May 15, 2019, and its English translation.

Office Action issued for counterpart Japanese Application No. 2019-47956, issued by the Japanese Patent Office dated May 15, 2019, and its English translation.

Office Action issued for counterpart Japanese Application No. 2019-114826, issued by the Japanese Patent Office dated Nov. 5, 2019, and its English translation.

Decision to Grant a Patent issued for counterpart Japanese Application No. 2019-47956, issued by the Japanese Patent Office dated Oct. 7, 2019, and its English translation.

International Search Report for PCT Application No. PCT/JP2020/024151 dated Oct. 6, 2020 and its English Translation.

Current claims of U.S. Appl. No. 17/541,705, filed Dec. 3, 2021.

Current claims of U.S. Appl. No. 17/620,444, filed Dec. 17, 2021.

Extended European Search Report for corresponding European Application No. 19819964.8 dated Jan. 18, 2022.

* cited by examiner

| No. | Question | Choice | ✓ |
|---|---|---|---|
| 1 | The manager asked you to be in charge of a duty that is new and unprecedented in the company. Other members have not decided. What is the type of duty you would be willing to try? | Case that could be a topic of conversation in the media | |
| | | Case where I can utilize my experience or skill | |
| | | Large scale case | |
| | | Case that would be the first in the industry | |
| | | Want to abstain from duty with no precedence | |
| 2 | It is now evident that the outlook for achieving the team performance goal is bleak. If the outlook for achieving your own goal is promising, what would you do? | Strive to achieve your own initial goal | |
| | | Aim above your own initial goal for the team | |
| | | Support member with poor outlook for reaching goal | |
| | | Provide instruction to member with poor outlook for reaching goal | |
| | | Respond if there is an instruction from the manager | |
| | | Propose a strategic meeting within the team | |
| 3 | The manager talked about setting a goal for the current fiscal term. The manager said the team set a higher goal for this fiscal term and would also like to have you set a higher goal and strive to achieve the goal together even if you are unsure whether the goal can be achieved. Would you be willing to take the challenge? | Absolutely no motivation | |
| | | No motivation | |
| | | Neither willing nor unmotivated | |
| | | Willing | |
| | | Willing to take the challenge with no issues | |
| ... | ... | ... | ... |

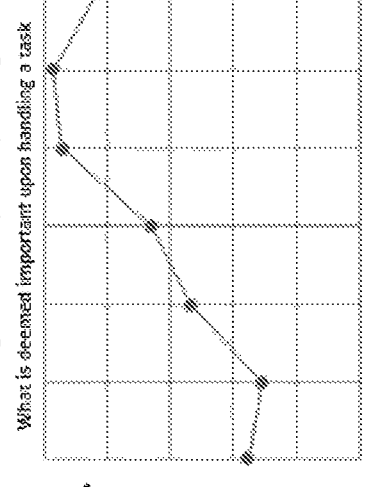

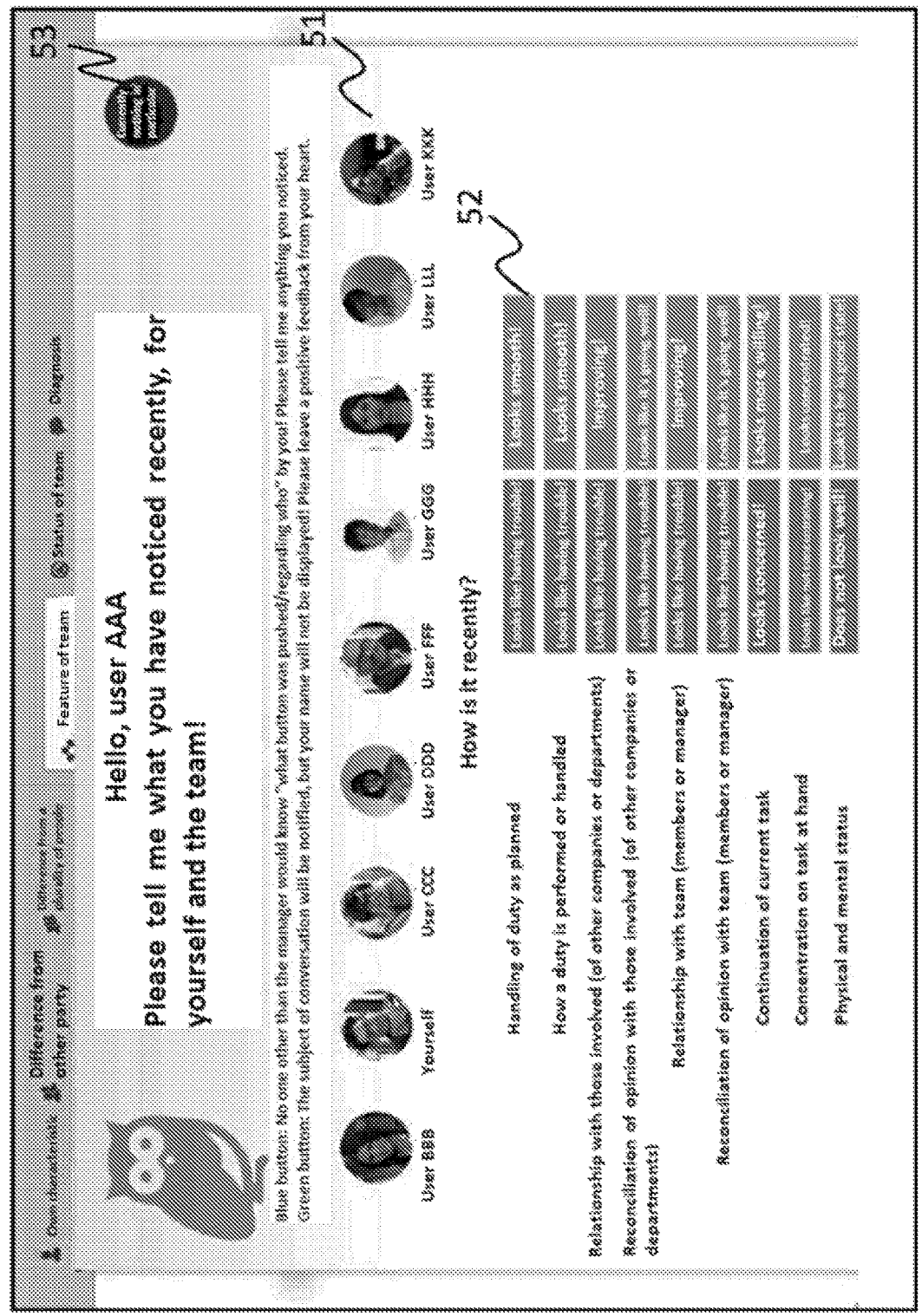

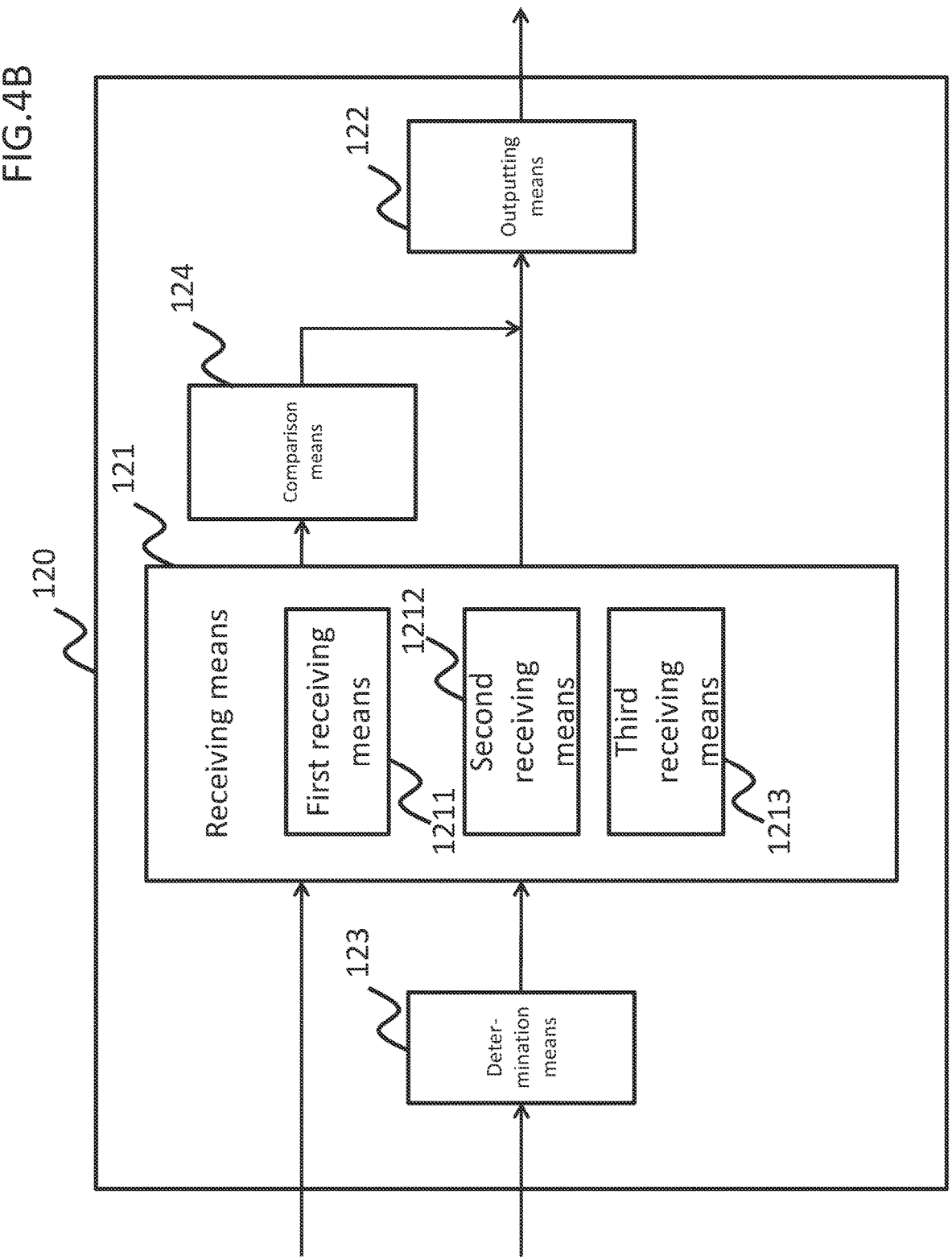

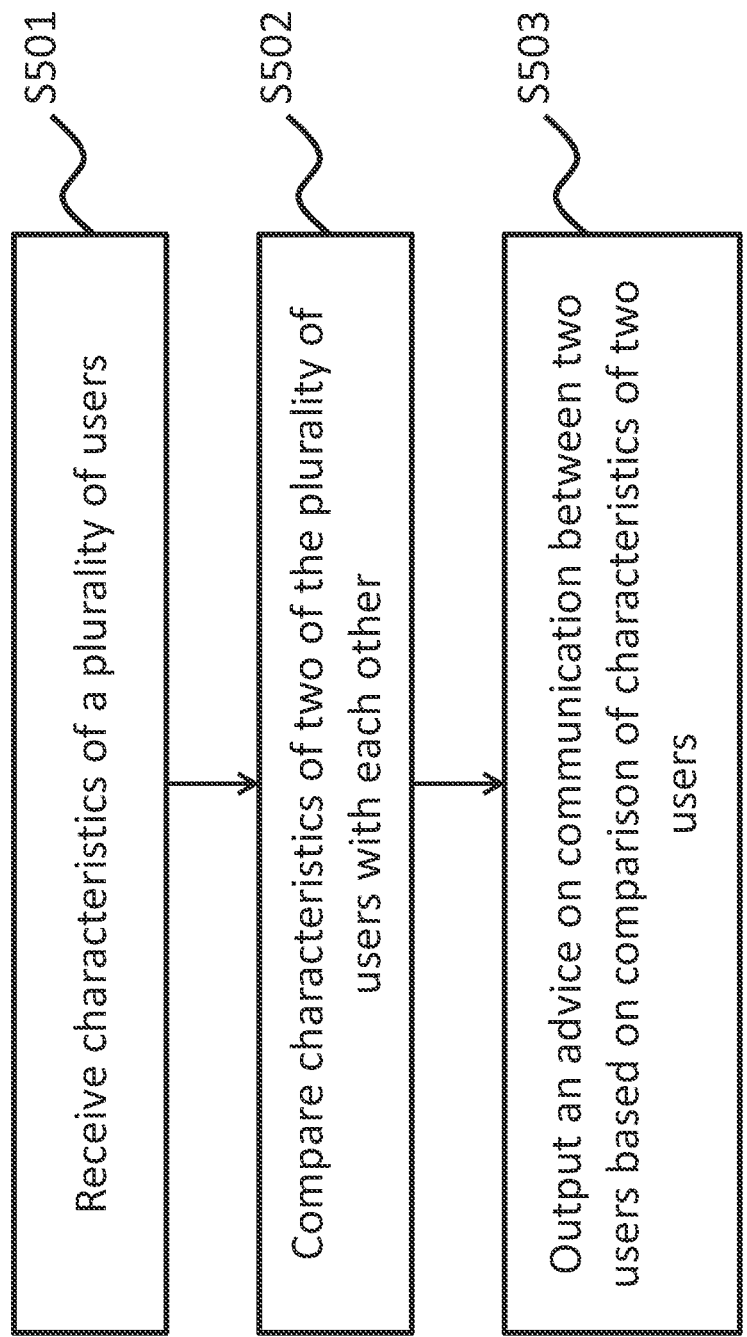

| | 5 | 4 | 3 | 2 | 1 | 0 | -1 | -2 | -3 | -4 | -5 |
|---|---|---|---|---|---|---|---|---|---|---|---|
| 5 | 100 | 90 | 79 | 69 | 59 | 49 | 39 | 29 | 19 | 10 | 0 |
| 4 | 90 | 92 | 82 | 72 | 62 | 52 | 42 | 32 | 22 | 13 | 3 |
| 3 | 79 | 82 | 85 | 75 | 65 | 55 | 45 | 35 | 26 | 16 | 7 |
| 2 | 69 | 72 | 75 | 78 | 68 | 58 | 48 | 38 | 29 | 19 | 10 |
| 1 | 59 | 62 | 65 | 68 | 71 | 61 | 51 | 42 | 32 | 23 | 13 |
| 0 | 49 | 52 | 55 | 58 | 61 | | 0 | 0 | 0 | 0 | 0 |
| -1 | 39 | 42 | 45 | 48 | 51 | 0 | 58 | 48 | 39 | 30 | 21 |
| -2 | 29 | 32 | 35 | 38 | 42 | 0 | 48 | 52 | 43 | 33 | 24 |
| -3 | 19 | 22 | 26 | 29 | 32 | 0 | 39 | 43 | 46 | 37 | 28 |
| -4 | 10 | 13 | 16 | 19 | 23 | 0 | 30 | 33 | 37 | 41 | 32 |
| -5 | 0 | 3 | 7 | 10 | 13 | 0 | 21 | 24 | 28 | 32 | 36 |

900

COMPUTER SYSTEM, PROGRAM, AND METHOD FOR PROVIDING ADVICE ON COMMUNICATION

TECHNICAL FIELD

The present invention relates to a computer system, program, or method for providing an advice to a user. More specifically, the present invention relates to a computer system, program, or method for providing an advance on communication.

BACKGROUND ART

A system for analyzing a status of a member in an organization and providing an advice on action to improve the status of the member and the organization is known (Patent Literature 1). The system provides an advice on how the member should act in the organization based on the difference between the status of the member and the status of the organization.

CITATION LIST

Patent Literature

[PTL 1] International Publication No. WO 2011/125272

SUMMARY OF INVENTION

Technical Problem

The inventors of the invention found that it is effective to provide an advice by considering the difference in characteristics from the other party in communication in addition to, or instead of, the characteristics of the entire organization when providing an advice on communication between a plurality of members cooperating in the organization. By providing an advice on communication by focusing on the difference in characteristics from the other party in communication instead of averaging the characteristics of a plurality of members, a member receiving the advice can communicate while being cognizant of the difference from the other party and make improvements to shortcomings in communication.

The objective of the present invention is to provide a computer system, program, or method for providing an advice on communication, which is capable of making improvements to shortcomings in communication.

Another objective of the present invention is to provide a computer system, program, or method for providing an advice on communication based on objective analysis instead of an indefinite variable element such as a rule of thumb, feeling, or subjective understanding.

Still another objective of the present invention is to provide a computer system, program, or method for evaluating communication between members with a readily understandable indicator.

Solution to Problem

The present invention provides a computer system for providing an advice on communication, the computer system comprising: receiving means for receiving characteristics of a plurality of users; comparison means for comparing characteristics of two of the plurality of users with each other; and outputting means for outputting an advice on communication between the two users based on comparison of the characteristics of the two users.

In one embodiment, the comparison means compares the characteristics of the two users with each other with respect to at least four viewpoints.

In one embodiment, each of the at least four viewpoints is further divided into a plurality of items, and the comparison means compares the characteristics of the two users with each other with respect to each of the plurality of items.

In one embodiment, the outputting means at least outputs an advice associated with an item with the greatest difference between the two users among the plurality of items.

In one embodiment, the outputting means diagrammatically outputs a result of comparison by the comparison means.

In one embodiment, the computer system further comprises determination means for determining the characteristics of the plurality of users based on inputted data, wherein the receiving means receives the characteristics of the plurality of users from the determination means.

In one embodiment, the determination means determines the characteristics with respect to at least four viewpoints.

In one embodiment, the determination means determines the characteristics using a correspondence table associating the inputted data with the at least four viewpoints.

In one embodiment, each of the at least four viewpoints is further divided into a plurality of items, and the determination means determines the characteristics using a correspondence table associating the inputted data with the plurality of items.

In one embodiment, the inputted data is data indicating responses to a question to the plurality of users.

In one embodiment, the inputted data is data indicating movements of the plurality of users.

In one embodiment, the comparison means compares a characteristic of an addition user among the plurality of users and the characteristics of the two users with each other, and the outputting means outputs an advice on communication between the two users and the additional user based on the comparison of the characteristics of the two users with the characteristic of the additional user.

The present invention provides a program for providing an advice on communication, wherein the program is executed in a computer system comprising a processing unit, and the program, when executed, causes the processing unit to perform processing comprising: receiving characteristics of a plurality of users; comparing characteristics of two of the plurality of users with each other; and outputting an advice on communication between the two users based on comparison of the characteristics of the two users.

The present invention provides a method for providing an advice on communication, wherein the method is executed in a computer system, and the method comprises: receiving characteristics of a plurality of users; comparing characteristics of two of the plurality of users with each other; and outputting an advice on communication between the two users based on comparison of the characteristics of the two users.

The present invention provides a computer system for providing an advice on communication, the computer system comprising: first receiving means for receiving a characteristic of a user; second receiving means for receiving a notification indicating that a user is in a certain state among a plurality of states; and outputting means for outputting a phrase that should be communicated to the user and a phrase that should not be communicated to the user based on the state and the characteristic of the user.

In one embodiment, the second receiving means receives a notification indicating that the user is in a good state and/or a notification indicating that the user is in a bad state.

In one embodiment, the second receiving means receives the notification in response to an input of a user that is different from the user.

In one embodiment, the second receiving means receives the notification in response to an input of the user.

In one embodiment, the characteristic is further divided into a plurality of items, and each of the plurality of states is associated with at least one of the plurality of items, and the outputting means outputs a phrase that should be communicated to the user and a phrase that should not be communicated to the user based on at least one of the plurality of items associated with the state among the characteristics of the user.

In one embodiment, the outputting means outputs the number and/or name of a user performing the input.

In one embodiment, the computer system further comprises determination means for determining the characteristics of the plurality of users based on inputted data, wherein the first receiving means receives the characteristics of the users from the determination means.

In one embodiment, the determination means determines the characteristics with respect to at least four viewpoints.

In one embodiment, the determination means determines the characteristics using a correspondence table associating the inputted data with the at least four viewpoints.

In one embodiment, each of the at least four viewpoints is further divided into a plurality of items, and the determination means determines the characteristics using a correspondence table associating the inputted data with the plurality of items.

In one embodiment, the inputted data is data indicating responses to a question to the plurality of users.

In one embodiment, the inputted data is data indicating movements of the plurality of users.

The present invention provides a program for providing an advice on communication, wherein the program is executed in a computer system comprising a processing unit, and the program, when executed, causes the processing unit to perform processing comprising: receiving a characteristic of a user; receiving a notification indicating that the user is in a certain state among a plurality of states; and outputting a phrase that should be communicated to the user and a phrase that should not be communicated to the user based on the state and the characteristic of the user.

The present invention provides a method for providing an advice on communication, wherein the method is executed in a computer system, and the method comprises: receiving a characteristic of a user; receiving a notification indicating that the user is in a certain state among a plurality of states; and outputting a phrase that should be communicated to the user and a phrase that should not be communicated to the user based on the state and the characteristic of the user.

The present invention provides a computer system for evaluating communication, the computer system comprising: receiving means for receiving a first result from evaluating communication from a first user to a second user by the first user, and a second result from evaluating communication from the first user to the second user by the second user; and outputting means for outputting a degree of achievement of communication between the first user and the second user, and a difference in perception on communication between the first user and the second user using a single indicator based on the first result and the second result.

In one embodiment, the outputting means outputs the indicator using a correspondence table associating the first result with the second result.

In one embodiment, the correspondence table is configured so that the indicator is higher for a higher first result or second result, and the indicator is higher for a smaller difference between the first result and the second result.

In one embodiment, the outputting means outputs the indicator as a numerical value.

In one embodiment, the computer system further comprises second receiving means for receiving a third result from evaluating communication from a second user to a first user by the second user, and a fourth result from evaluating communication from the second user to the first user by the first user, wherein the outputting means outputs a degree of achievement of communication between the first user and the second user, and a difference in perception on communication between the first user and the second user using a single indicator based on the first result, the second result, the third result, and the fourth result.

In one embodiment, the outputting means outputs a degree of achievement of communication between the first user and the second user, and a difference in perception on communication between the first user and the second user using a single indicator by averaging a first indicator obtained based on the first result and the second result and a second indicator obtained based on the third result and the fourth result.

The present invention provides a program for evaluating communication, wherein the program is executed in a computer system comprising a processing unit, and the program, when executed, causes the processing unit to perform processing comprising: receiving a first result from evaluating communication from a first user to a second user by the first user, and a second result from evaluating communication from the first user to the second user by the second user; and outputting a degree of achievement of communication between the first user and the second user, and a difference in perception on communication between the first user and the second user using a single indicator based on the first result and the second result.

The present invention provides a method for providing an advice on communication, wherein the method is executed in a computer system, and the method comprises: receiving a first result from evaluating communication from a first user to a second user by the first user, and a second result from evaluating communication from the first user to the second user by the second user; and outputting a degree of achievement of communication between the first user and the second user, and a difference in perception on communication between the first user and the second user using a single indicator based on the first result and the second result.

Advantageous Effects of Invention

The present invention can provide a computer system, program, or method for providing an advice on communication, which is capable of making improvements to shortcomings in communication. This improves communication among members of an organization and promotes cooperation between members of the organization, leading to improved efficiency. The present invention can also promote efficiency in management of an organization.

The present invention can also provide a computer system, program, or method for providing an advice on communication based on objective analysis. This enables elimination of advices based on an indefinite variable element such as a rule of thumb, feeling, or subjective understanding and enables suitable communication with a member of an organization.

The present invention can further provide a computer system, program, or method for evaluating communication between members with a readily understandable indicator. This enables the quality of communication between members of an organization to be readily understood and compared, and enables the status of the organization to be readily understood.

BRIEF DESCRIPTION OF DRAWINGS

FIG. 1A is a diagram showing an example of a survey table 10 for analyzing a characteristic of a member in an organization.

FIG. 1C is a diagram showing an example of a result display screen 20-2 for displaying a result of analyzing a response in the survey table 10 with the computer system of the invention.

FIG. 2A is a diagram showing an example of report screen 50 for a member in an organization to report the status of each member to a manager using the computer system of the invention.

FIG. 2B is a diagram showing an example of a notification screen 60 for notifying that a member in an organization is in a negative state.

FIG. 3C is a diagram showing a result display screen 80 for showing a result of analyzing the quality of communication between each member of the organization based on the evaluation inputted in the evaluation screen 70-1 or 70-2.

FIG. 4B is a block diagram showing an example of the configuration of a processing unit 120.

FIG. 5 is a flowchart showing an example of processing 500 performed in the computer system 100 for providing an advice on communication.

FIG. 6 is a diagram showing an example of a correspondence table 600 for determining a characteristic of a user.

FIG. 9 is a diagram showing an example of a correspondence table 900 for determining an indicator.

DESCRIPTION OF EMBODIMENTS

The embodiments of the invention are described hereinafter while referring to the diagrams.

1. Providing Advice Based on Analysis on Characteristic of a User

FIG. 1A shows an example of a survey table 10 that is used for analyzing a characteristic of a member in an organization.

The survey table 10 includes a plurality of questions, which are generally questions asking about an action chosen in a certain situation and questions asking about how a user feels about a certain situation. Each member in the organization responds to each question in a multiple choice format. A user responds by, for example, entering a check mark at the right end of the survey table 10 to select the relevant choice.

This example describes analysis of a work-related characteristic of a member in an organization. A question asking about an action chosen in a certain situation is, for example, "The manager asked you to be in charge of a duty that is new and unprecedented in the company. Other members have not decided. What is the type of duty you would be willing to try?", and a response is given from choices such as "Case that could be a topic of conversation in the media" and "Case where I can utilize my experience or skill". A question asking about an action chosen in a certain situation is, for example, "It is now evident that the outlook for achieving the team performance goal is bleak. If the outlook for achieving your own goal is promising, what would you do?", and a response is given from choices such as "Strive to achieve your own initial goal" and "Aim above your own initial goal for the team".

A question asking about how a user feels about a certain situation is, for example, "The manager talked about setting a goal for the current fiscal term. The manager said the team set a higher goal for this fiscal term and would also like to have you set a higher goal and strive to achieve the goal together even if you are unsure whether the goal can be achieved. Would you be willing to take the challenge?", and a response is given from five levels of choices from "Absolutely no motivation" to "Willing to take the challenge with no issues".

The questions and response choices thereof in the survey table 10 are merely exemplary. Other questions and response choices can be used. The number of choices can be any number that is two or greater.

The response of each member of the organization in the survey table 10 is inputted into the computer system of the invention and analyzed.

Figure 1B:
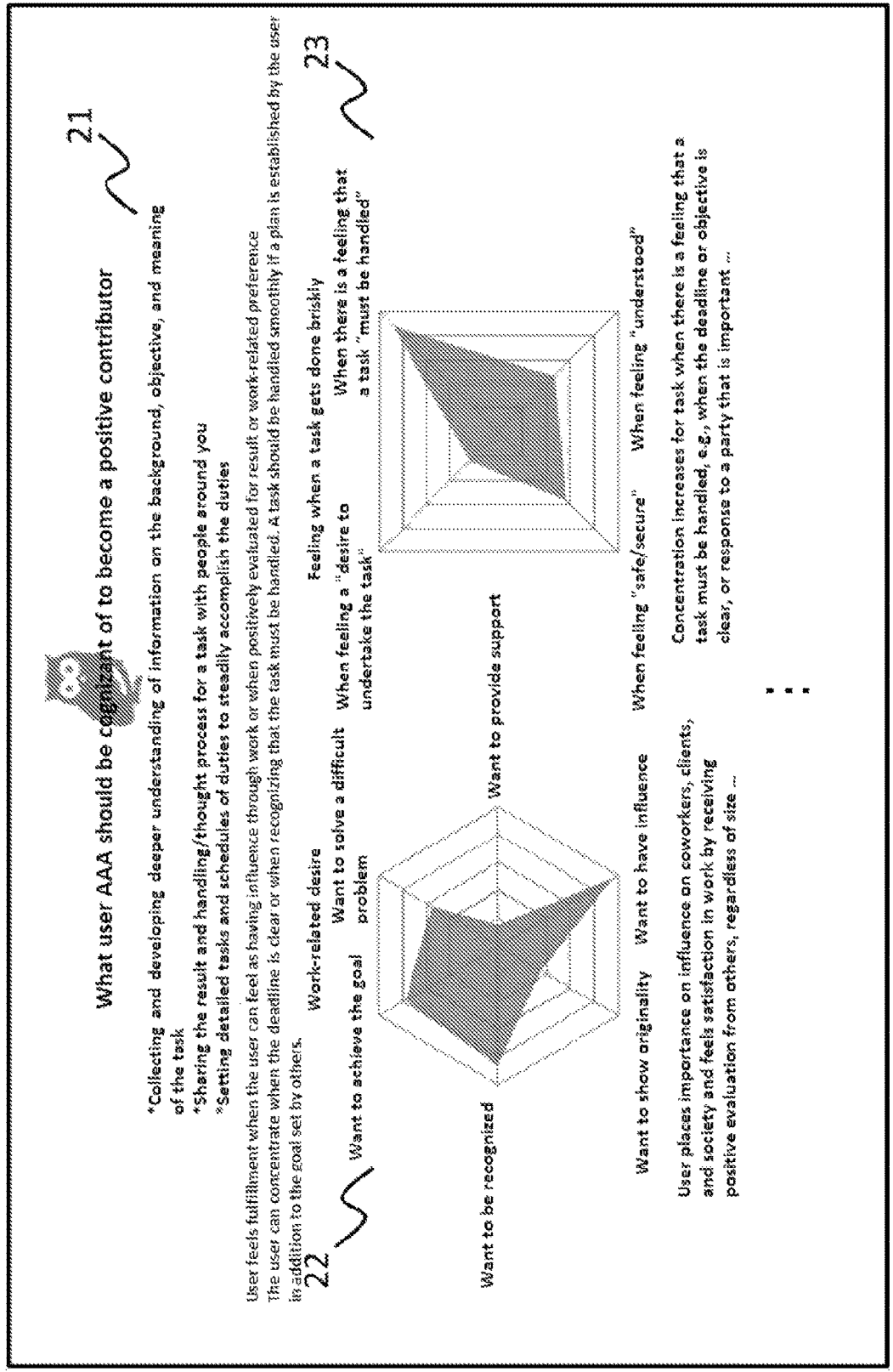
FIG. 1B is a diagram showing an example of a result display screen 20-1 for displaying a result of analyzing a response in the survey table 10 with the computer system of the invention.

FIGS. 1B and 1C show an example of result display screens 20-1 and 20-2 for displaying a result of analyzing a response in the survey table 10 with the computer system of the invention. The result display screens 20-1 and 20-2 can be configured so that the result display screen 20-2 is displayed when the result display screen 20-1 is scrolled down, or can be configured to be displayed as separate screens.

As one example, the result display screens 20-1 and 20-2 display a result of analyzing the response of user AAA given in the survey table 10 by the computer system of the invention.

The result display screen 20-1 comprises, for example, a first display section 21, a second display section 22, and a third display section 23. The first display section is a section that displays an advice related to what user AAA should be cognizant of to become a positive contributor based on the characteristic of user AAA determined from the response of user AAA. The second display section 22 is a section that displays a characteristic of desire of user AAA determined from the response of user AAA. In this regard, the characteristics of desire of user AAA are displayed in a radar chart with items "Want to solve a difficult problem", "Want to provide support", "Want to have influence", "Want to show originality", "Want to be recognized", and "Want to achieve the goal" under the viewpoint of "Work-related desire". The third display section 23 is a section that displays a characteristic of an intracranial transmitter of user AAA determined from the response of user AAA. In this regard, the characteristics of the intracranial transmitter of user AAA are displayed in a radar chart with items "When there is a feeling that a task 'must be handled'", "When feeling 'understood'", "When feeling 'safe/secure'", and "When feeling a 'desire to undertake the task'" under the viewpoint of "Feeling when a task gets done briskly".

For example, the second display section 22 in FIG. 1B shows that user AAA has a high work-related desires such as "Want to have influence", "Want to be recognized", and "Want to achieve the goal". The third display section 23 in FIG. 1B shows that a task gets done briskly, for example, "When there is a feeling that a task 'must be handled'" and "When feeling 'safe/secure'" for user AAA.

For user AAA with such characteristics, the computer system of the invention determines, and displays on the first display section 21, that user AAA should be cognizant of, for example, "collecting and developing deeper understanding of information on the background, objective, and meaning of the task", "sharing the result and handling/thought process for a task with people around you", and "setting detailed tasks and schedules of duties to steadily accomplish the duties" to become a positive contributor. This allows user AAA to receive an advice on what the user should be cognizant of to become a positive contributor, simply by responding to the survey table 10.

The result display screen 20-2 includes, for example, a fourth display section 24, a fifth display section 25, and a sixth display section 26. The fourth display section 24 is a section that displays an advice related to what user AAA should be cognizant of to work while minimizing stress based on the characteristics of user AAA determined from a response of user AAA. The fifth display section 25 is a section that displays a characteristic of preference of user AAA determined from a response of user AAA. In this regard, the characteristics of preference of user AAA are displayed with a line graph with items "Feeling", "Connectedness", "Teamwork", "Progress management", "Fact analysis", "Level of perfection", and "Scope of role" under the viewpoint of "What is deemed important upon handling a task". The sixth display section 26 is a section that displays a characteristic of how user AAA feels stress determined from a response of user AAA. In this regard, characteristics of how user AAA feels stress are displayed with an area graph with items "Qualitative goal", "Quantitative goal", "Reachable goal", "Lofty goal", "How to perform a duty is unclear", "Background or reason is unclear", "Reporting/consultation as needed", "Frequent reporting/consultation", "Change in plan", "Plan is determined", "Duty with a long span", "Duty with a short span", "Association with the same person", "Association with a new person", "Involve someone else", and "Handled alone" under the viewpoint of "What user feels as stressful".

For example, the fifth display section 25 in FIG. 1C shows that "level of perfection", "fact analysis", and "scope of role" are deemed important upon handling a task for user AAA. The sixth display section 26 in FIG. 1C shows that user AAA feels stress from, for example, "frequent reporting/consultation" and "change in plan".

For user AAA with such characteristics, the computer system of the invention determines, and displays on the fourth display section 24, that user AAA should be cognizant of, for example, "setting a clear criteria for the degree of completion of a task and sharing the criteria with the people around you", "setting the frequency of reporting consultation matching the state by consulting with the manager", and "understanding a change in the state of a task and taking measures that presumes a change in advance" to work while minimizing stress. This allows user AAA to receive an advice on what the user should be cognizant of to work while minimizing stress, simply by responding to the survey table 10.

The above example describes that the computer system of the invention determines a characteristic of user AAA, and provides an advice to user AAA, but the computer system of the invention can also determine a characteristic for each member of the organization besides user AAA as shown in FIGS. 1B and 1C and provide an advice on what the user should be cognizant of to become a positive contributor and an advice on what the user should be cognizant of to work while minimizing stress, based on the characteristics.

The computer system of the invention can further provide an advice on what the members should be cognizant to become a positive contributor when working together, and an advice on what the members should be cognizant of to work while minimizing stress, based on the characteristics determined for each member of the organization.

Figure 1D:
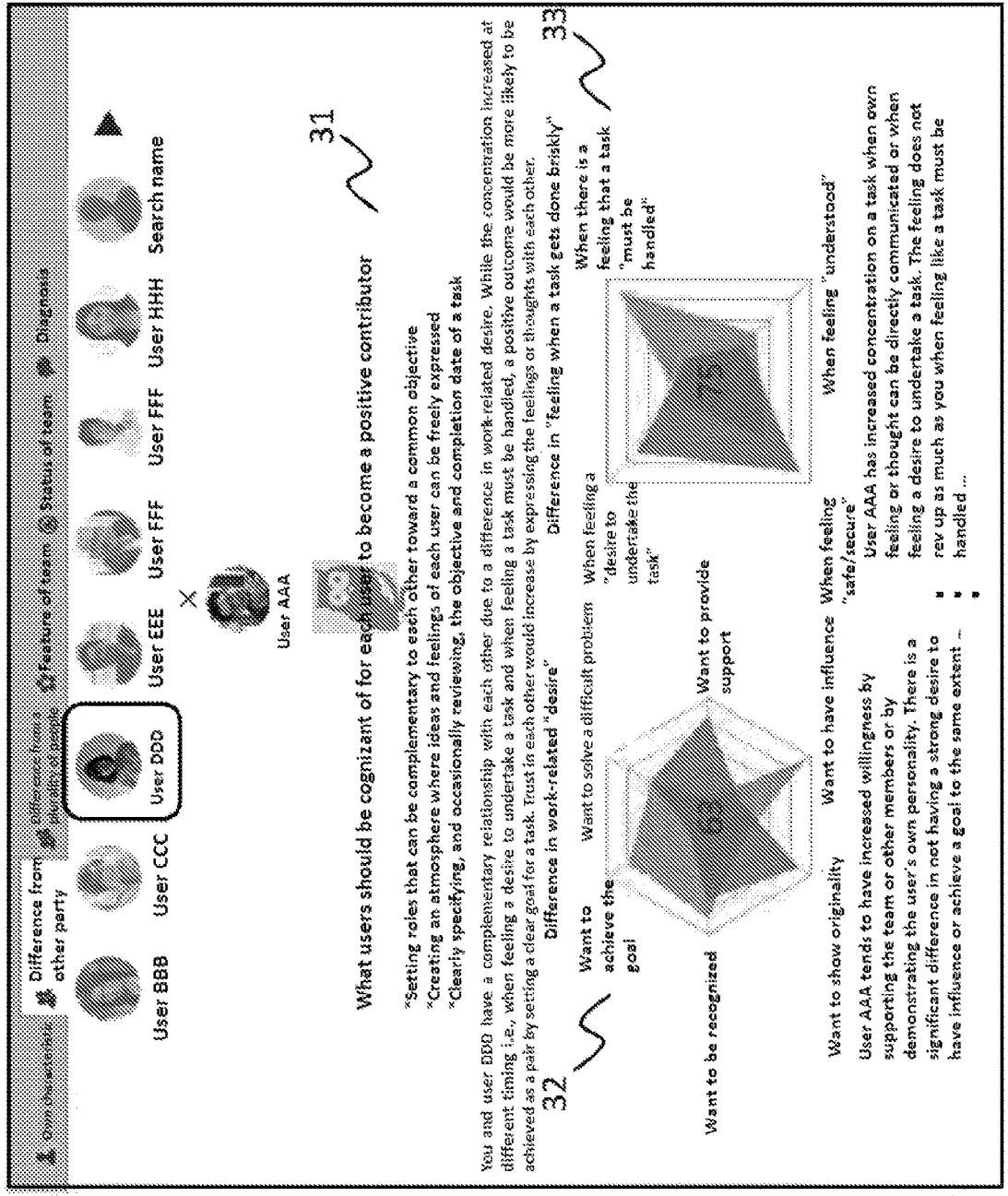
FIG. 1D is a diagram showing an example of a result display screen 30 for displaying a result of analyzing a response in the survey table 10 with the computer system of the invention.

FIG. 1D shows an example of a result display screen 30 for displaying a result of analyzing a response in the survey table 10 with the computer system of the invention.

As an example, the result display screen 30 displays a result of analyzing a response of user AAA and a response of user DDD responding to the survey table 10 by the computer system of the invention.

The result display screen 30 includes, for example, a first display section 31, a second display section 32, and a third display section 33. The first display section 31 is a section that displays an advice on what user AAA and user DDD should be cognizant of to become a positive contributor when working together, based on the characteristics of user AAA determined from a response of user AAA and the characteristics of user DDD determined from a response of user DDD.

The second display section 32 is a section that displays a characteristic of desire of user AAA determined from a response of user AAA and a characteristic of desire of user DDD determined from a response of user DDD. The second display section 32 displays a characteristic of desire of user AAA and a characteristic of desire of user DDD using a radar chart similar to that of the second display section 21 in FIG. 1B. The characteristic of desire of user AAA and characteristic of desire of user DDD can be configured to be displayed in different forms (e.g., different color intensity, hue, shading, or the like). The overlapping portion between the characteristic of desire of user AAA and the characteristic of desire of user DDD can also be configured to be displayed in different forms. This allows the commonality and difference between the characteristic of desire of user AAA and the characteristic of desire of user DDD to be visually readily recognizable.

The third display section 33 is a section that displays a characteristic of an intracranial transmitter of user AAA determined from a response of user AAA and a characteristic of an intracranial transmitter of user DDD determined from a response of user DDD. The third display section 33 displays a characteristic of an intracranial transmitter of user AAA and a characteristic of an intracranial transmitter of user DDD using a radar chart similar to that of the third display section 23 in FIG. 1B. The characteristic of an intracranial transmitter of user AAA and characteristic of an intracranial transmitter of user DDD can be configured to be displayed in different forms (e.g., different color intensity, hue, shading, or the like). The overlapping portion between the characteristic of an intracranial transmitter of user AAA and the characteristic of an intracranial transmitter of user DDD can also be configured to be displayed in different forms. This allows the commonality and difference between the characteristic of an intracranial transmitter of user AAA and the characteristic of an intracranial transmitter of user DDD to be visually readily recognizable.

For example, the second display section 32 in FIG. 1D shows that user AAA and user DDD share work-related desires such as "Want to be recognized" and "Want to solve a difficult problem" and differ with respect to work-related desires such as "Want to achieve the goal" and "Want to have influence". The third display section 33 in FIG. 1D shows that user AAA and user DDD share when a task gets done briskly such as "When feeling 'safe/secure'", and differ in when a task gets done briskly such as "When there is a feeling that a task 'must be handled'".

For user AAA and user DDD with such commonality and difference in characteristics, the computer system of the invention determines, and displays on the first display section 31, that user AAA and user DDD should be cognizant of, for example, "setting roles that can be complementary to each other toward a common objective", "creating an atmosphere where ideas and feelings of each user can be freely expressed", and "clearly specifying, and occasionally reviewing, the objective and completion date of a task" for each user to become a positive contributor. This allows user AAA and user DDD to receive an advice on what the users should be cognizant of to become a positive contributor when working together or an advice on what type of communication should be established, simply by responding to the survey table 10.

Although not shown, the computer system of the invention can be configured to display result display screens including a fourth display section, a fifth display section, and a sixth display section corresponding to the fourth display section 24, fifth display section 25, and sixth display section 26 in FIG. 1C, wherein the fourth display section, fifth display section, and sixth display section can be configured to display an advice on what user AAA and user DDD should be cognizant of to work while minimizing stress, characteristics of preference of user AAA and user DDD, and characteristics of how user AAA and user DDD feel stress, respectively. This allows user AAA and user DDD to receive an advice on what the users should be cognizant of to work with each other while minimizing stress when working together or an advice on what type of communication should be established, simply by responding to the survey table 10.

The example shown in FIG. 1D describes providing an advice in relation to user AAA and user DDD, but an advice can be provided in relation to any members in the organization by changing the partner in the combination.

The computer system of the invention can also provide an advice on what members should be cognizant of to become a positive contributor when working as a team consisting of the plurality of members and an advice on what the members should be cognizant of to work while minimizing stress based on characteristics determined for each member in the organization.

Figure 1E:
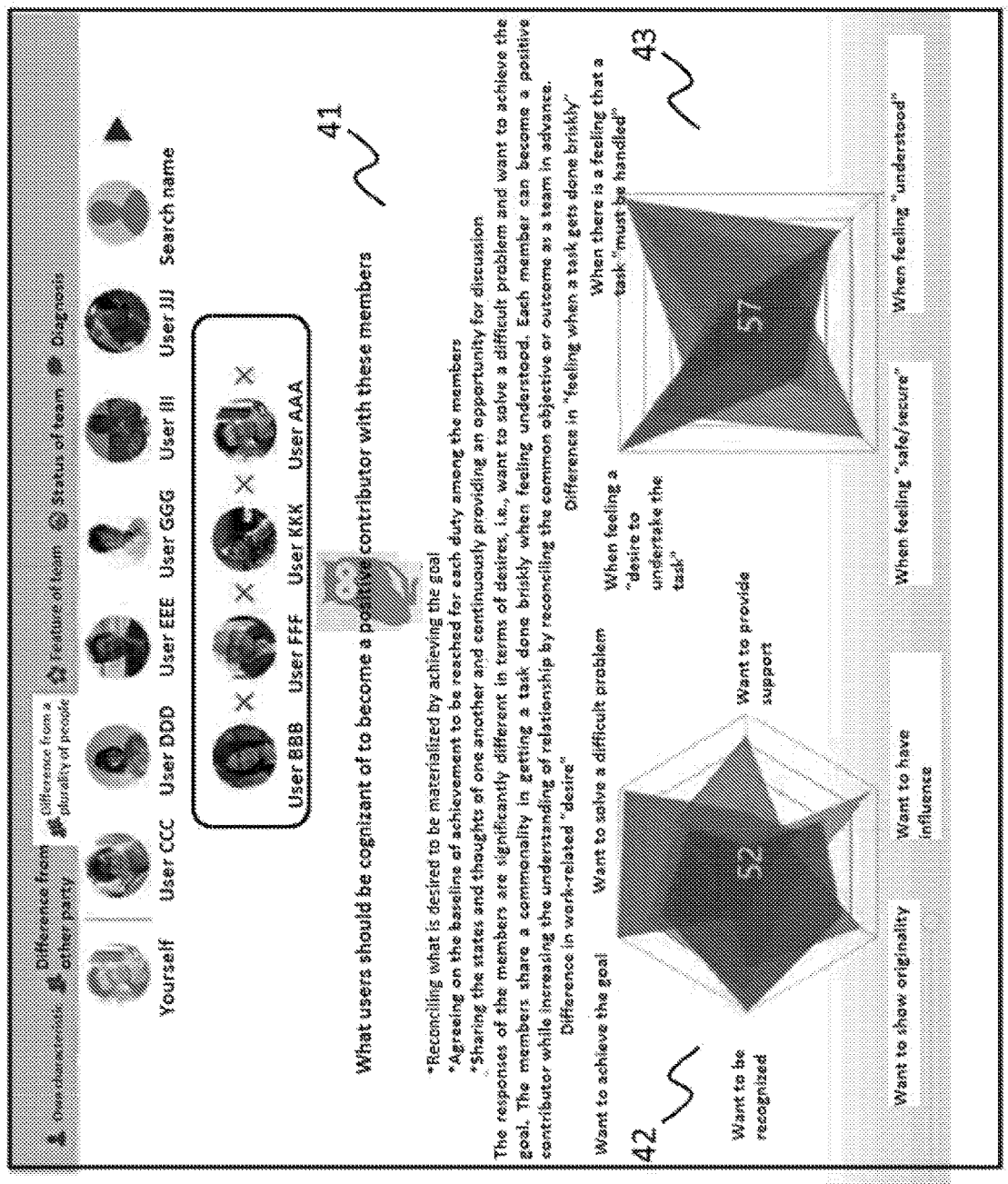
FIG. 1E is a diagram showing an example of a result display screen 40 for displaying a result of analyzing a response in the survey table 10 with the computer system of the invention.

FIG. 1E shows an example of a result display screen 40 for displaying a result of analyzing a response in the survey table 10 with the computer system of the invention.

As an example, the result display screen 40 shows a result of analyzing responses of user AAA, user BBB, user FFF, and user KKK responding to the survey table 10 by the computer system of the invention for a team consisting of user AAA, user BBB, user FFF, and user KKK.

The result display screen 40 includes, for example, a first display section 41, a second display section 42, and a third display section 43. The first display section 41 is a section that displays an advice on what each member of a team should be cognizant of to become a positive contributor when working as a team consisting of user AAA, user BBB, user FFF, and user KKK, based on the characteristics of user AAA determined from a response of user AAA, the characteristics of user BBB determined from a response of user BBB, the characteristics of user FFF determined from a response of user FFF, and the characteristics of user KKK determined from a response of user KKK.

The second display section 42 is a section that displays a characteristic of desire of user AAA determined from a response of user AAA, a characteristic of desire of user BBB determined from a response of user BBB, a characteristic of desire of user FFF determined from a response of user FFF, and a characteristic of desire of user KKK determined from a response of user KKK. The second display section 42 displays a characteristic of desire of each member of the team using a radar chart similar to that of the second display section 22 in FIG. 1B. The characteristic of desire of each member of the team can be configured to be displayed in different forms (e.g., different color intensity, hue, shading, or the like). The overlapping portion between the characteristics of desire of each member of the team can also be configured to be displayed in different forms. This allows the commonality and difference between the characteristics of desire of each member of the team to be visually readily recognizable.

The third display section 43 is a section that displays a characteristic of an intracranial transmitter of user AAA determined from a response of user AAA, a characteristic of an intracranial transmitter of user BBB determined from a response of user BBB, a characteristic of an intracranial transmitter of user FFF determined from a response of user FFF, and a characteristic of an intracranial transmitter of user KKK determined from a response of user KKK. The third display section 43 displays a characteristic of an intracranial transmitter of each member of the team using a radar chart similar to that of the third display section 23 in FIG. 1B. The characteristic of an intracranial transmitter of each member of the team can be configured to be displayed in different forms (e.g., different color intensity, hue, shading, or the like). The overlapping portion between the characteristics of an intracranial transmitter of each member of the team can also be configured to be displayed in different forms. This allows the commonality and difference between the characteristics of an intracranial transmitter of each member of the team to be visually readily recognizable.

For example, the second display section 42 in FIG. 1E shows that each member of the team differs significantly in work-related desires such as "Want to solve a difficult problem" and "Want to achieve the goal". The third display section 43 in FIG. 1B shows that each member of the team shares when a task gets done briskly such as "When feeling 'understood'", and differ significantly in when a task gets done briskly such as "When there is a feeling that a task 'must be handled'".

For each member of the team with such commonality and difference in characteristics, the computer system of the invention determines, and displays on the first display section 41, that members of the team should be cognizant of, for example, "reconciling what is desired to be materialized by achieving the goal", "agreeing on the baseline of achievement to be reached for each duty among the members", and "sharing the states and thoughts of one another and continuously providing an opportunity for discussion" to become a positive contributor. This allows each member of the team to receive an advice on what each member of the team should be cognizant of to become a positive contributor when working as a team or an advice on what type of communication should be established, simply by responding to the survey table 10.

Although not shown, the computer system of the invention can be configured to display result display screens including a fourth display section, a fifth display section, and a sixth display section corresponding to the fourth display section 24, fifth display section 25, and sixth display section 26 in FIG. 1C, wherein the fourth display section, fifth display section, and sixth display section can be configured to display an advice on what each member of the team should be cognizant of to work while minimizing stress when working as a team, characteristics of preference of each member of the team, and characteristics of how each member of the team feels stress, respectively. This allows each member of the team to receive an advice on what the members should be cognizant of to work while minimizing stress when working as a team or an advice on what type of communication should be established, simply by responding to the survey table 10.

The example shown in FIG. 1E describes providing an advice to a team consisting of user AAA, user BBB, user FFF, and user KKK, but an advice can be provided to a team consisting of any member in the organization by changing the members constituting the team.

FIG. 2A shows an example of a report screen 50 for a member in an organization to report the status of each member to a manager using the computer system of the invention.

As an example, the report screen 50 displays a screen for user AAA to report the status of a member of a team.

The report screen 50 includes a member display section 51, a selection button 52, and a "Currently nothing in particular" button 53. The member display section 51 is a section that displays members in an organization. The section can be configured to display all members in the organization or some of the members, such as members excluding those in a managerial position.

The member whose status user AAA wishes to report is selected from the member display section 51. User AAA then selects one of a plurality of states for the status of the member, and selects whether the state is a positive state (good state) or a negative state (bad state). For example, if user AAA feels that user CCC is having trouble with how a duty is performed or handled, user AAA can report this to a manger by selecting user CCC from the member display section 51 and selecting the "Looks like having trouble!" button in the section of "How a duty is performed or handled" among the selection buttons 52. If, for example, user AAA feels that user LLL is becoming more willing to continue with the current task, user AAA can report this to a manager by selecting user LLL from the member display section 51 and selecting "Looks more willing!" button in the section of "Continuation of current task" among the selection buttons 52. For example, user AAA can also self-report the user's own status. In such a case, user AAA is selected from the member display section 51 and a relevant button among the selection buttons 52 is selected. For example, if user AAA does not currently have any thoughts, the "Currently nothing in particular" button 53 can be selected to end the report screen 50.

The plurality of states displayed on the report screen 50 is one example, so that other states can be used. The state is not limited to two choices of good state and bad state. The number of choices can be any number that is 2 or greater. A state can also be evaluated and reported in multiple levels.

Reporting of the status of a member in an organization being a positive state (good state) can be notified to a manager and the member. This allows a manager to be aware of the state of a member in the organization and the member to have increased motivation. The status of a member in the organization reported as a negative state (bad state) can be notified to a manager, but not to the member.

Figure 2B:
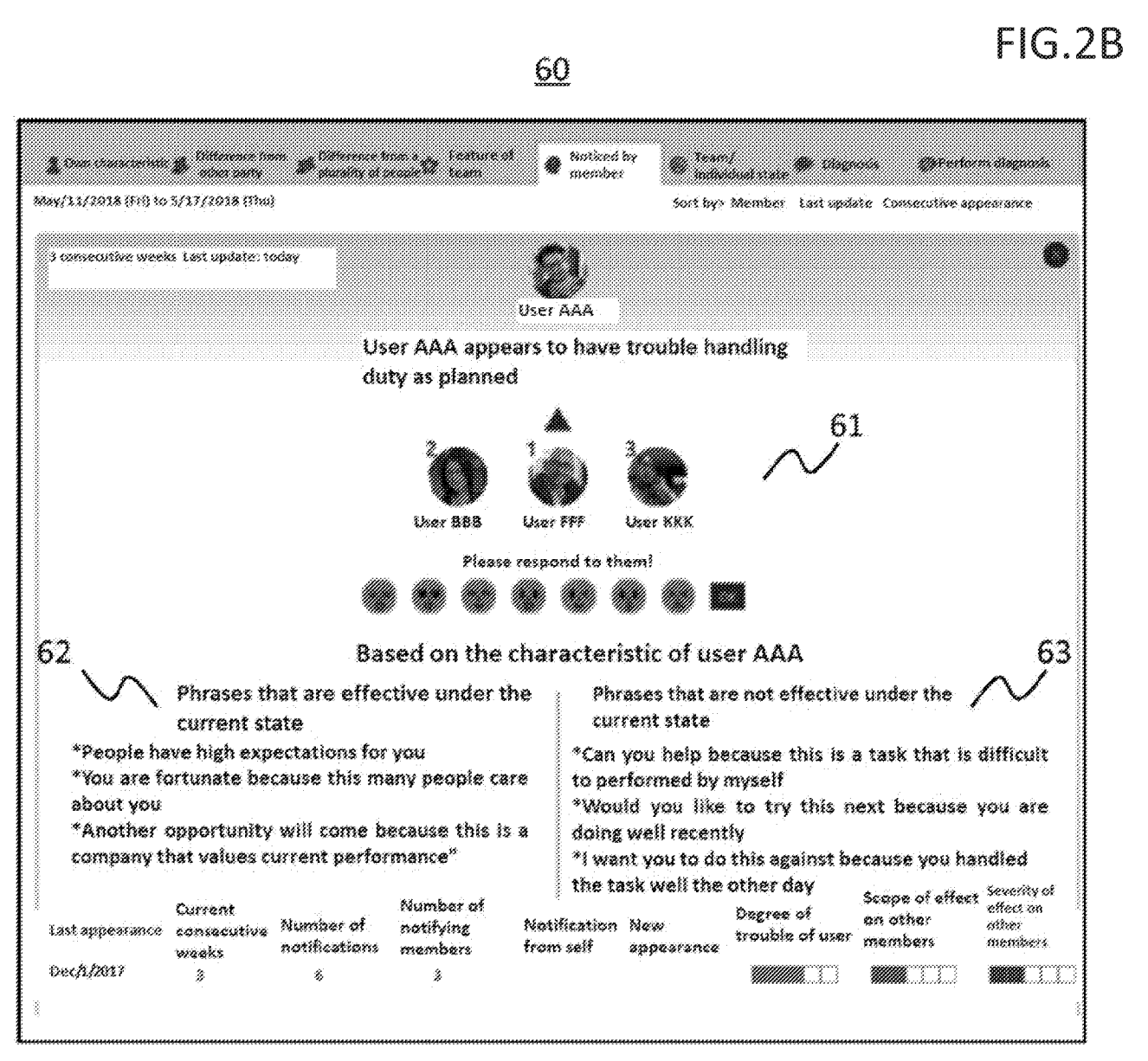

FIG. 2B shows an example of a notification screen 60 for notifying that a member in an organization is in a negative state.

As an example, the notification screen 60 displays a screen for notifying that user AAA is in a state where the user is having trouble with handling a duty as planned. The notification screen 60 can be displayed, for example, by a report indicating user AAA being in a negative state in the report screen 50 as a trigger. For example, the notification screen 60 can be configured to be viewable by only those with the authorization to manage the organization such as a manager.

The notification screen 60 includes a reporter display section 61, a first phrase display section 62, and a second phrase display section 63.

The reporter display section 61 displays the person who reported user AAA as appearing to have trouble handling a duty as planned, where three members (user BBB, user FFF, and user KKK) are displayed. The reporter display section can be configured to display, for example, only the number of persons who sent a report, or the name of the person reporting and the time of reporting.

The first phrase display section 62 displays a phrase that is effective for user AAA in the current state or a phrase that should be communicated to user AAA, based on the characteristic of user AAA. A phrase that is effective for user AAA in the current state can be, for example, "people have high expectations for you", "you are fortunate because this many people care about you", "another opportunity will come because this is a company that values current performance", or the like.

The second phrase display section 63 displays a phrase that is not effective for user AAA in the current state or a phrase that should not be communicated to user AAA, based on the characteristic of user AAA. A phrase that is not effective for user AAA in the current state can be, for example, "can you help because this is a task that is difficult to performed by myself", "would you like to try this next because you are doing well recently", "I want you to do this against because you handled the task well the other day", or the like.

A phase that is effective displayed on the first phrase display section 62 and a phrase that is not effective displayed on the second phrase display section 63 vary depending on the characteristic and state of user AAA. Since this allows an effective phrase and an ineffective phrase to match the characteristic and current state of a person, a manager would be able to provide an advice matching the characteristic and current state of the person instead of an advice based on a rule of thumb or feeling.

(Evaluation of Quality of Communication Between Users)

Figure 3A:
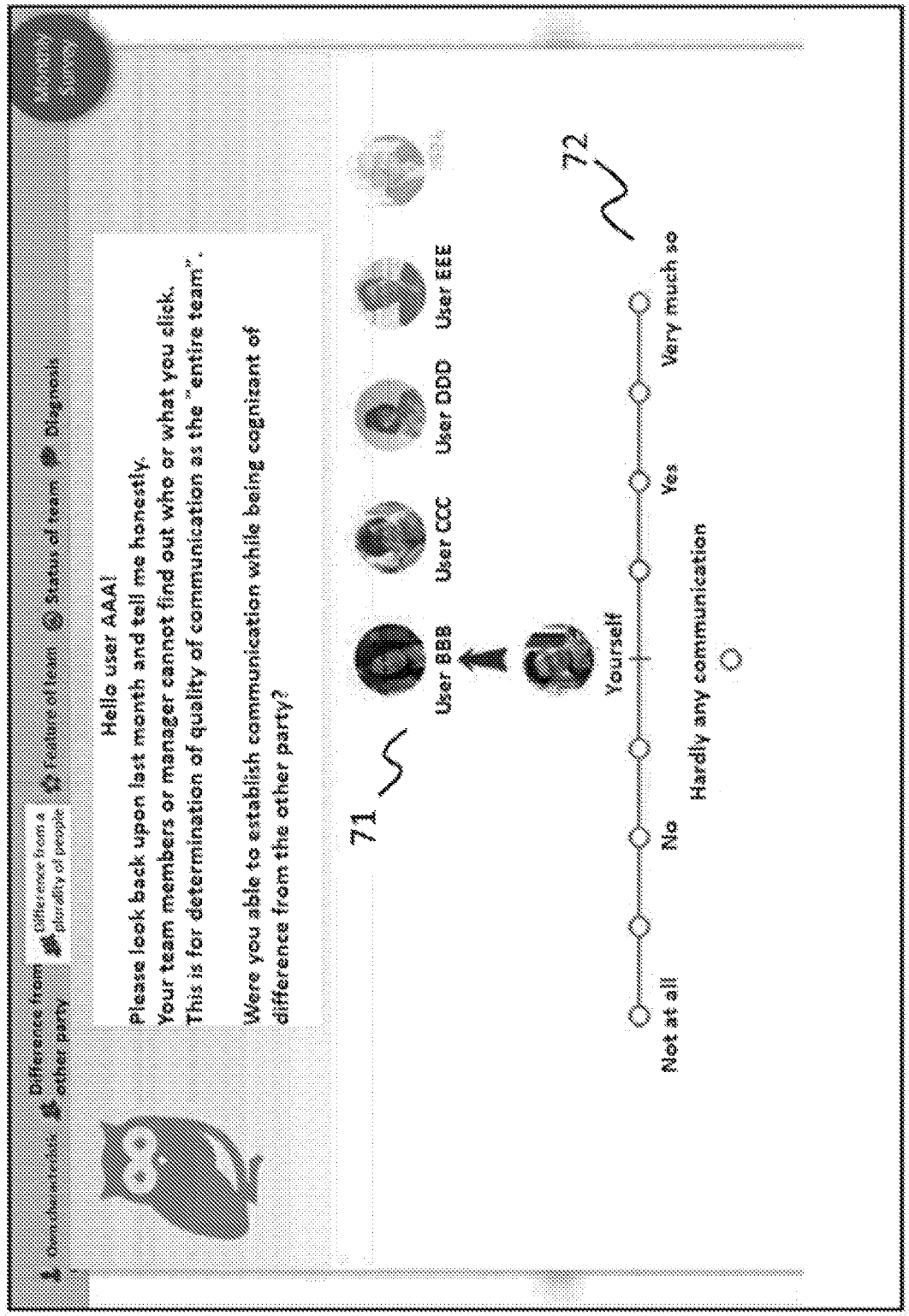
FIG. 3A is a diagram showing an example of an evaluation screen 70-1 for a member in an organization to evaluate communication with another member in the organization using the computer system of the invention.
Figure 3B:
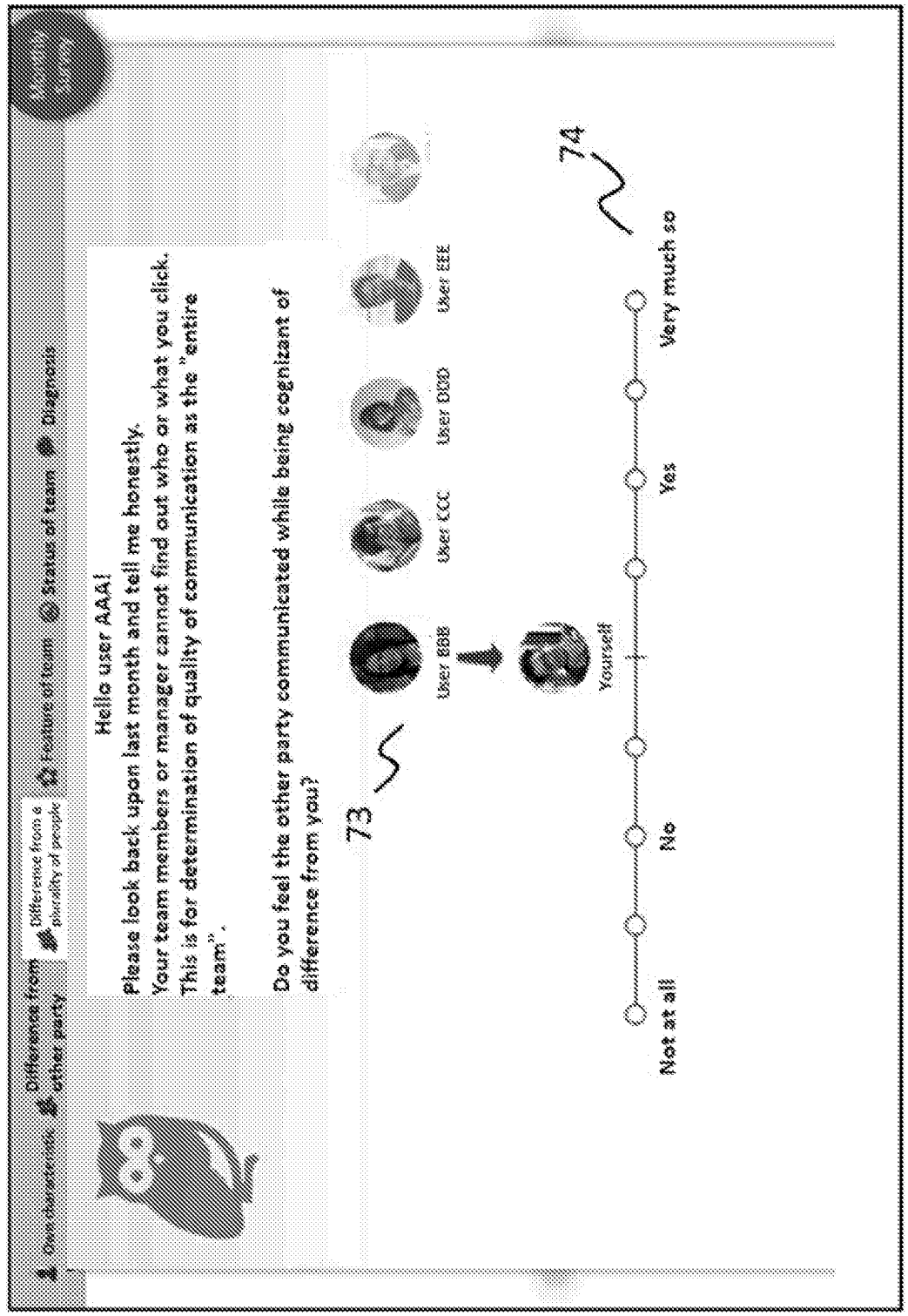
FIG. 3B is a diagram showing an example of an evaluation screen 70-2 for a member in an organization to evaluate communication with another member in the organization using the computer system of the invention.

FIGS. 3A and 3B show an example of evaluation screens 70-1 and 70-2 for a member in an organization to evaluate communication with another member in the organization using the computer system of the invention.

As an example, the evaluation screens 70-1 and 70-2 display a screen for user AAA to evaluate communication with another member in the organization. The evaluation screen 70-1 is a screen for user AAA to evaluate communication from user AAA to another member in the organization, and the evaluation screen 70-2 is a screen for user AAA to evaluate communication from another member in the organization to user AAA.

The evaluation screen 70-1 includes an evaluation subject display section 71 and an evaluation selection button 72. The evaluation subject display section 71 is a section that displays a member in an organization who can be a subject of evaluation. The evaluation subject display section 71 can be configured to display all members in the organization or some of the members, such as members excluding those in a managerial position. The evaluation subject display section 71 displays a person subjected to evaluation of communication by user AAA. A subject of evaluation can be displayed, for example, by selecting a specific person from candidates, or displayed in order from user BBB in front. The evaluation selection button 72 is a button for evaluating communication from user AAA to a subject of evaluation. Communication with a subject of evaluation can be evaluated by selecting a relevant button for nine levels of communication cognizant of a difference with the other party, from "Not at all" to "Very much so". While an example was described for evaluating with nine levels, this can be a two level evaluation, three level evaluation, four level evaluation, or the like. The number of levels of evaluation can be any number. Level evaluation can also use simple numerical values such as "−3, −2, −1, 0, 1, 2, 3".

If, for example, user AAA feels that communication cognizant of a difference from user BBB could not be established in the communication with user BBB, user BBB is displayed on the evaluation subject display section 71, and "No" is selected with the evaluation selection button 72. If, for example, user AAA feels that there was hardly any communication with user EEE, user EEE is displayed on the evaluation subject display section 71, and "Hardly any communication" is selected with the evaluation selection button 72.

The evaluation screen 70-2 includes an evaluation subject display section 73 and an evaluation selection button 74. The evaluation subject display section 73 is a section that displays a member in an organization who can be a subject of evaluation. The evaluation subject display section 73 can be configured to display all members in the organization or some of the members, such as members excluding those in a managerial position. The evaluation subject display section 73 displays a person subjected to evaluation of communication by user AAA. A subject of evaluation can be displayed, for example, by selecting a specific person from candidates, or displayed in order from user BBB in front. The evaluation selection button 74 is a button for evaluating communication from a subject of evaluation to user AAA. Communication from a subject of evaluation to user AAA can be evaluated by selecting a relevant button for eight levels, corresponding to whether the subject of evaluation communicated while being cognizant of a difference from user AAA, from "Not at all" to "Very much so" by the subject of evaluation. While an example was described for evaluating with eight levels, this can be a two level evaluation, three level evaluation, four level evaluation, or the like. The number of levels of evaluation can be any number. Level evaluation can also use simple numerical values such as "−3, −2, −1, 0, 1, 2, 3".

If, for example, user AAA feels that user BBB did not establish communication cognizant of a difference from user AAA in communication from user BBB to user AAA, user BBB is displayed on the evaluation subject display section 73, and "No" is selected with the evaluation selection button 74. If, for example, user AAA strongly feels that user EEE communicated with user AAA while being cognizant of a difference from user AAA in communication from user EEE to user AAA, user EEE is displayed on the evaluation subject display section 73, and "Very much so" is selected with the evaluation selection button 74.

In this manner, subjective evaluation and objective evaluation by user AAA on communication between user AAA and another member in the organization are inputted.

In the above examples, evaluation by user AAA was described, but other members in the organization can similarly evaluate communication with each member in the organization subjectively and objectively. This reveals the perception of each member on communication with each member.

Figure 3C:
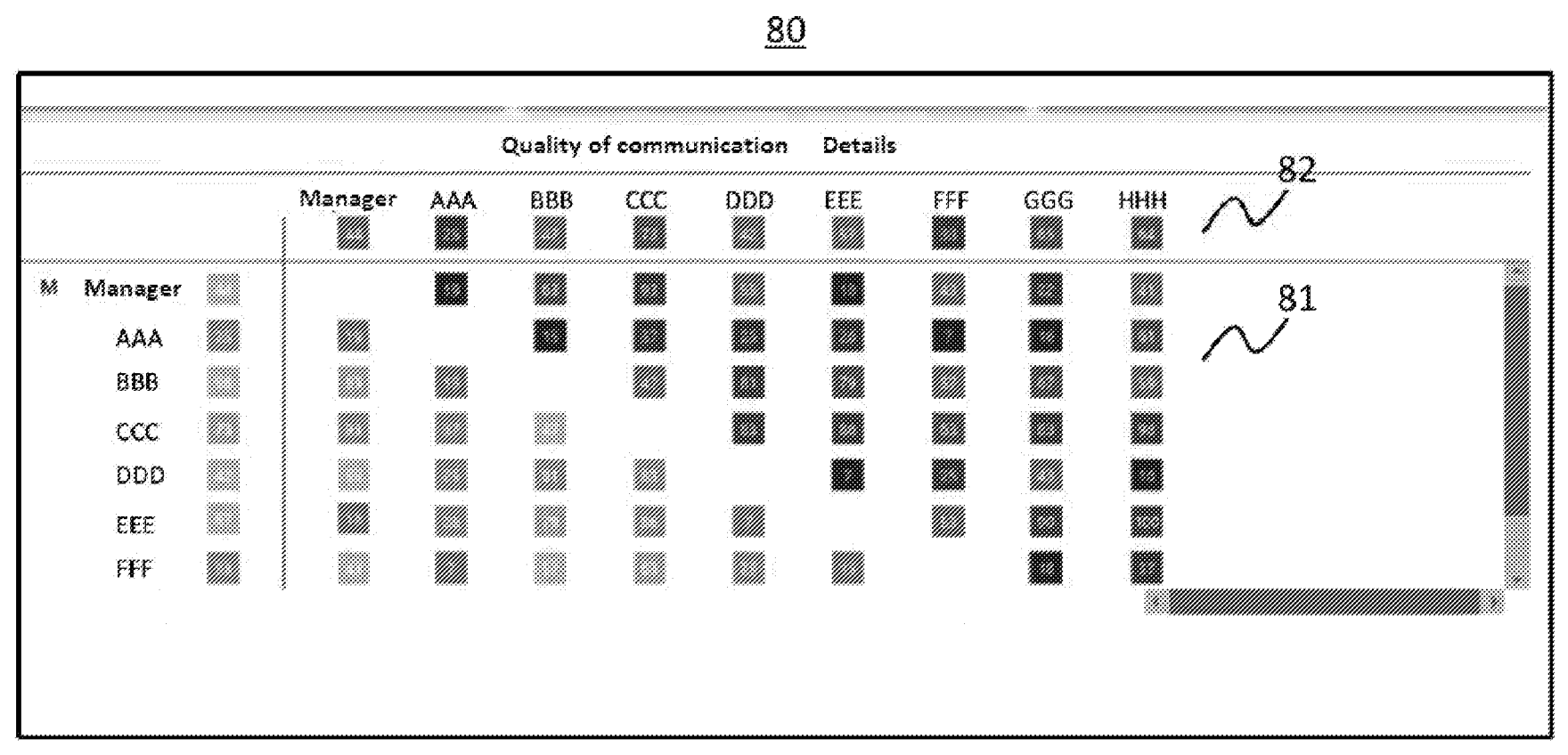

FIG. 3C shows a result display screen 80 showing a result of analyzing the quality of communication between each member of an organization based on the evaluation inputted in the evaluation screen 70-1 or 70-2.

The result display screen 80 can be configured to be viewable by only those with the authorization to manage the organization such as a manager. The result display screen 80 includes a first display section 81 and a second display section 82. The first display section 81 is a section that displays the quality of communication between each member of the organization by a score of 0 to 100. A score of 0 indicates the worst quality communication, and a score of 100 indicates the best quality communication. The second display section 82 is a section that displays the quality of communication of each individual by a score of 0 to 100. The quality of communication of an individual can be determined in accordance with the quality of communication between the individual and each member of the organization.

The result display screen 80 displays a score with a darker color for lower quality communication. This allows a person viewing the result display screen 80 to readily visually recognize who and who have poor communication.

The result display screen 80 also displays quality of communication of a manger of the organization and the quality of communication between the manager and each member. This allows a person viewing the result display screen 80 to quantitatively understand not only the relationship between members of the organization, but also the relationship between members and manager of the organization to objectively grasp the state of the organization.

The above examples describe evaluation of whether communication cognizant of the other party was able to be established, but the present invention is not limited thereto. Evaluation of communication to the other party from any viewpoint is within the scope of the present invention. For example, whether communication considering time, place, or occasion was able to be established can be evaluated, or whether communication was able to be established can be vaguely evaluated.

The above examples describe analysis of a characteristic of a member in a work-related organization to provide an advice on work-related communication, and evaluation of the quality of work-related communication, but the present invention is not limited thereto. A characteristic of a member in any organization can be analyzed to provide an advice on communication under any situation, and the quality of communication under any situation can be evaluated. For example, a characteristic of a member on a sports team can be analyzed to provide an advice on communication during a sporting event or practice, and the quality of communication during a sporting event or practice can be evaluated. For example, a characteristic of a member of a class at school can be analyzed to provide an advice on communication during school activities, and the quality of communication during school activities can be evaluated.

The computer system 100 of the invention, which is capable of providing an advice on communication or evaluating the quality of communication as described above, is described hereinafter.

2. Configuration of Computer System 100

Figure 4A:
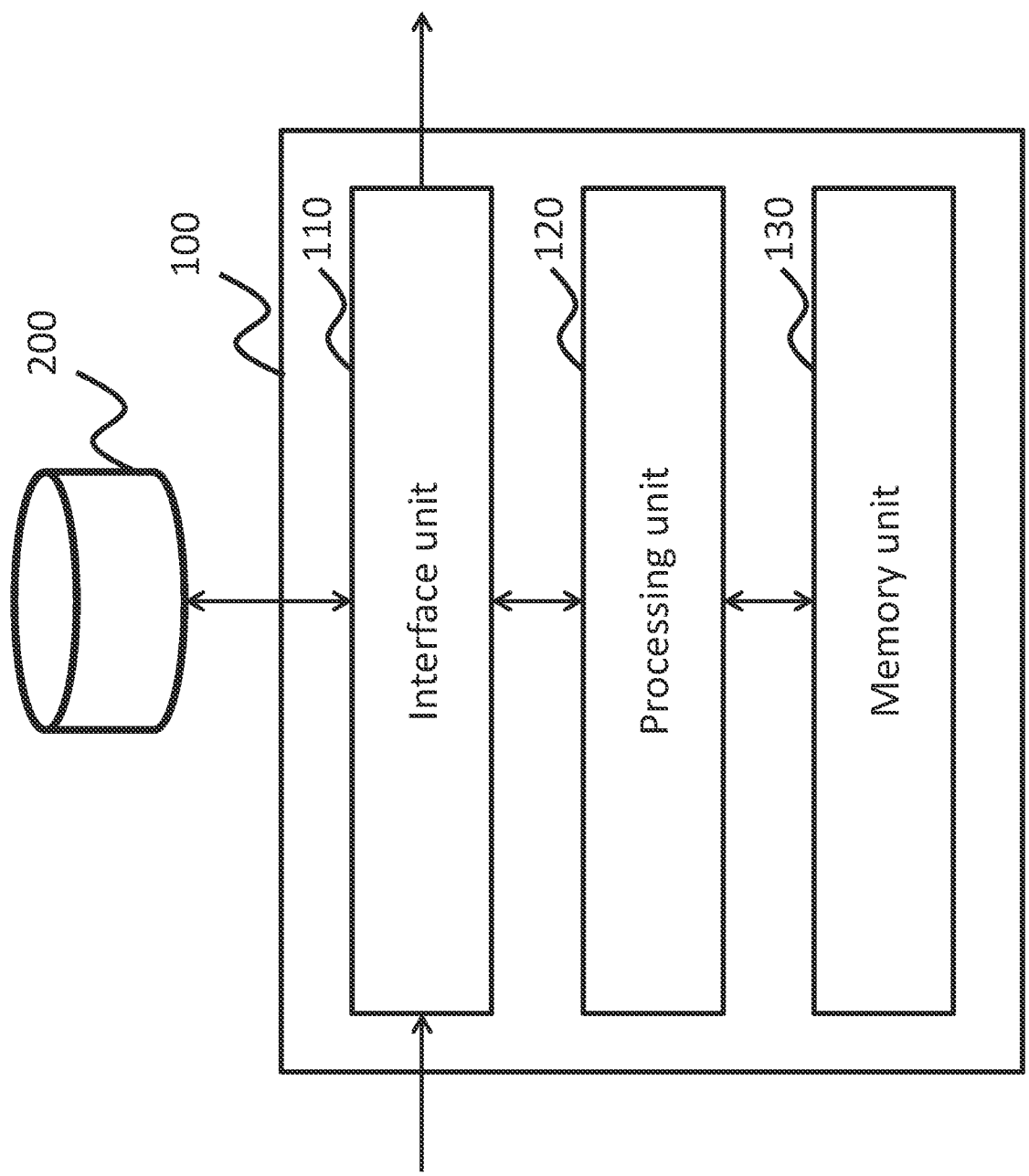
FIG. 4A is a block diagram showing an example of the configuration of the computer system 100 of the invention, which is capable of providing an advice on communication or evaluating the quality of communication.

FIG. 4A shows an example of the configuration of the computer system 100 of the invention, which is capable of providing an advice on communication or evaluating the quality of communication.

The computer system 100 comprises an interface unit 110, a processing unit 120, and a memory unit 130. The computer system 100 is connected to a database unit 200.

The interface unit 110 exchanges information with an element that is external to the computer system 100. The processing unit 120 of the computer system 100 can receive information from an element that is external to the computer system 100 via the interface unit 110 and transmit information to an element that is external to the computer system 100. The interface unit 110 can exchange information in any form.

The interface unit 110 comprises, for example, an input unit that enables input of information into the computer system 100. The input unit can enable input of information into the computer system 100 in any mode. If, for example, the input unit is a touch panel, the input unit can be configured so that a user inputs information by touching the touch panel. Alternatively, if the input unit is a mouse, the input unit can be configured so that a user inputs information by operating the mouse. Alternatively, if the input unit is a keyboard, the input unit can be configured so that a user inputs information by pressing a key on the keyboard. Alternatively, if the input unit is a microphone, the input unit can be configured so that a user inputs information by inputting an audio into the microphone. Alternatively, if the input unit is a camera, the input unit can be configured so that information captured by the camera is inputted. Alternatively, if the input unit is a data reader, the input unit can be configured so that information is inputted by reading out information from a storage medium connected to the computer system 100. Alternatively, if the input unit is a receiver, the input unit can be configured so that the receiver receives information as an input from an element that is external to the computer system 100 via a network. In such a case, the network can be any type of network. For example, a receiver can receive information via the Internet, or via a LAN.

The interface unit 110 comprises, for example, an output unit that enables output of information from the computer system 100. The output unit can enable output of information from the computer system 100 in any mode. If, for example, the output unit is a display screen, the output unit can be configured so that information is outputted to the display screen. Alternatively, if the output unit is a speaker, the output unit can be configured so that information is outputted by audio from the speaker. Alternatively, if the output unit is a data writer, the output unit can be configured so that information is outputted by writing information on a storage medium connected to the computer system 100. Alternatively, if the output unit is a transmitter, the transmitted can output information by transmitting the information to an element that is external to the computer system 100 via a network. In such a case, the network can be any type of network. For example, a transmitter can transmit information via the Internet, or via a LAN.

The processing unit 120 executes processing of the computer system 100 and controls the overall operation of the computer system 100. The processing unit 120 reads out a program stored in the memory unit 130 and executes the program, which can make the computer system 100 function as a system executing desired steps. The processing unit 120 can be implemented by a single processor or a plurality of processors.

The memory unit 130 stores a program that is required for executing the processing of the computer system 100, data required for executing the program, and the like. The memory unit 130 can store a program (e.g., program materializing the processing shown in FIG. 5, 7, or 8 described below) for instructing the processing unit 120 to perform processing for providing an advice on communication or processing for evaluating communication. In this regard, a program can be stored in the memory unit 130 in any manner. For example, a program can be preinstalled in the memory unit 130. Alternatively, a program can be installed in the memory unit 130 by downloading via a network. In such a case, the network can be any type of network. The memory unit 130 can be implemented by any storing means.

The database unit 200 stores, for example, advices provided to a user. An advice provided to a user can be stored, for example, after being associated with a user characteristic. If, for example, a user characteristic includes at least four viewpoints, an advice provided to the user is stored after being associated with at least one of at least four viewpoints. For example, the database unit 200 can store an advice for a user with a low score for a viewpoint, and advice for a user with a moderate score for a viewpoint, an advice for a user with a high score for a viewpoint, and the like for each viewpoint. For example, the database unit 200 can store an advice for a user/team with a large difference in scores for a viewpoint, an advice for a user/team with a small difference in scores for a viewpoint, and the like for each viewpoint. If, for example, each of the at least four viewpoints is further divided into a plurality of items, an advice provided to a user is stored after being associated with at least one of a plurality of items of each of the at least four viewpoints. For example, the database unit 200 can store an advice for a user with a low score for an item, an advice for a user with a moderate score for an item, an advice for a user with a high score for an item, and the like for each of the plurality of items of each viewpoint. For example, the database unit 200 can store an advice for a user/team with a large difference in scores for an item, an advice for a user/team with a small difference in scores for an item, and the like for each of the plurality of items of each viewpoint.

In the example shown in FIG. 4A, the database unit 200 is provided external to the computer system 100, but the present invention is not limited thereto. The database unit 200 can also be provided inside the computer system 100. At this time, the database unit 200 can be implemented by the same storing means as the storing means implementing the memory unit 130, or by storing means that is different from the storing means implementing the memory unit 130. In either case, the database unit 200 is configured as a storing unit for the computer system 100. The configuration of the database unit 200 is not limited to a specific hardware configuration. For example, the database unit 200 can be configured as a single hardware part, or as a plurality of hardware parts. For example, the database unit 200 can be configured as an external hard disk apparatus of the computer system 100 or as a storage on the cloud connected via a network.

FIG. 4B shows an example of the configuration of the processing unit 120.

The processing unit 120 comprises at least receiving means 121 and outputting means 122.

The receiving means 121 can comprise first receiving means 1211 for receiving a characteristic of at least one user. The first receiving means 1211 can receive, for example, a characteristic of a user inputted into the computer system 100 via the interface unit 110 from the interface unit 110, or a characteristic of a user determined by determination means 123 that the processing unit 120 can comprise from the determination means 123. At this time, the determination means 123 can receive data inputted into the computer system 100 via the interface unit 110 from the interface unit 110.

The receiving means 121 can comprise second receiving means 1212 for receiving a notification indicating that a user is in a certain state among a plurality of states. For example, the second receiving means 1212 can receive a notification in accordance with data inputted into the computer system 100 via the interface unit 110. Examples of notifications indicating that a user is in a certain state among a plurality of states include a notification indicating that a user is in a good state and a notification indicating that a user is in a bad state. A plurality of states can be, for example, a plurality of states encountered by a user at work. As shown in FIG. 2A, examples thereof include, but are not limited to, "state of having trouble with handling of a duty as planned", "state where a duty is handled smoothly in terms of handling of duty as planned", "state of having trouble with how a duty is performed or handled", "state where a duty is handled smoothly in terms of how a duty is performed or handled", and the like.

The receiving means 121 can comprise third receiving means 1213 for receiving a result of evaluating communication between users. For example, the third receiving means 1213 can receive a result of evaluating communication between users in response to an input provided to the computer system 100 via the interface unit 110. Examples of results of evaluating communication between users include a result of self-evaluation by a user on communication from the user to another user and a result of self-evaluation by another user on communication from the another user to the user. The third receiving means 1213 can be configured to receive a result of self-evaluation by a user on communication from the user to another user and a result of self-evaluation by another user on communication from the another user to the user, together or separately. If results are received separately, the third receiving means 1213 can be comprised of a plurality of receiving means.

The first receiving means 1211, the second receiving means 1212, and the third receiving means 1213 of the receiving means 121 can be constituted as the same receiving means or a plurality of receiving means.

The outputting means 122 processes information and provides a specific output. An output from the outputting means 122 can be outputted to an element that is external to of the computer system 100 via the interface unit 110.

For example, the outputting means 122 provides an output based on a result of comparison provided from comparison means 124 that the processing unit 120 can comprise. At this time, the outputting means 122 can output an advice on communication between two users based on a difference in characteristics of the two users provided from the comparison means 124, or based on the commonality in the characteristics of the two users provided from the comparison means 124. For example, the outputting means 122 can be configured to output a result of comparison provided from the comparison means 124. At this time, the outputting means 122 can output a result of comparison as, for example, a diagram, text, or audio via the interface unit 110.

For example, the outputting means 122 provides an output based on a state indicated in a notification provided from the receiving means 121 and a characteristic of a user provided from the receiving means 121. At this time, the outputting means 122 can output a phrase that should be communicated to the user and a phrase that should not be communicated to the user in the state indicated in the notification provided from the receiving means 121. The outputting means 122 can output information on a user providing an input triggering a notification, indicated by the notification provided from the receiving means 121, such as the number of users or user name.

For example, the outputting means 122 provides an output based on a result of evaluating communication between users provided by the receiving means 121. At this time, the outputting means 122 outputs the degree of achievement of the communication between users and a difference in the perception between the users on the communication using a single indicator, which can be, for example, a numerical value such as 0 to 100, a symbol representing levels such as ◎○△●X, but is preferably a numerical value from 0 to 100. This is because the indicator can be readily recognized as high/low. A single indicator would represent the quality of communication between users.

As described above, the processing unit 120 can comprise the determination means 123 and the comparison means 124.

The determination means 123 receives data inputted into the computer system 100 via the interface unit 110 from the interface unit 110 and determines a characteristic of a user from the data. For example, the determination means 123 determines a characteristic of a user with respect to at least four viewpoints. The four viewpoints can be, for example, the characteristic of desire, characteristic of intracranial transmitter, characteristic of preference, and characteristics of how a user feels stress described in reference to FIGS. 1B and 1C. The determination means 123 can also be configured to determine a characteristic of a user from another viewpoint instead of, or in addition to, the four viewpoints described above.

Data provided to the determination means 123 can be, for example, data indicating a response to a question to a user shown in FIG. 1A or data indicating a movement of a user. For example, data indicating a movement of a user can be extracted from data captured with a camera or a microphone. Extraction of data indicating a movement of a user from data captured with a camera or a microphone can be accomplished using, for example, a known movement recognition technology or voice recognition technology.

The comparison means 124 compares characteristics of at least two users provided from the receiving means 121 with each other. For example, the comparison means 124 compares characteristics of at least two users with each other with respect to at least four viewpoints. The four viewpoints can be, for example, the characteristic of desire, characteristic of intracranial transmitter, characteristic of preference, and characteristics of how a user feels stress described in reference to FIGS. 1B and 1C. For example, the comparison means 124 can be configured to identify commonality in the characteristics of at least two users, or to identify a difference in the characteristics of at least two users. For example, the comparison means 124 can be configured to compute the degree of commonality in the characteristics of at least two users or to compute the degree of difference in the characteristics of at least two users.

Each constituent element of the computer system 100 described above can be comprised of a single hardware part or a plurality of hardware parts. If comprised of a plurality of hardware parts, each hardware part can be connected in any mode. Each hardware part can be connected wirelessly or by wired connection. The computer system 100 of the invention is not limited to a specific hardware configuration. The processing unit 120 comprised of an analog circuit instead of a digital circuit is also within the scope of the invention. The configuration of the computer system 100 of the invention is not limited to those described above, as long as the function thereof can be materialized.

3. Processing by Computer System 100

FIG. 5 shows an example of processing 500 performed in the computer system 100 for providing an advice on communication. The computer system 100 can provide an advice on what type of communication two users should have by performing the processing 500. For example, an advice can be provided to the two users or a manager of an organization.

At step S501, the receiving means 121 of the processing unit 120 receives characteristics of a plurality of user. The receiving means 121 can receive characteristics of a plurality of users inputted via the interface unit 110, or the receiving means 121 can receive characteristics of a plurality of users determined by the determination means 123 based on data inputted via the interface unit 110.

For example, characteristics of users can have at least four viewpoints. The four viewpoints can be, for example, the characteristic of desire, characteristic of intracranial transmitter, characteristic of preference, and characteristic of how a user feels stress. For example, a user characteristic can be configured to be inputted via the interface unit 110 for at least four viewpoints, or determined for at least four viewpoints by the determination means 123. For example, the determination means 123 determines a characteristic of a user using a correspondence table that associates data inputted via the interface unit 110 with at least four viewpoints.

Figure 6:
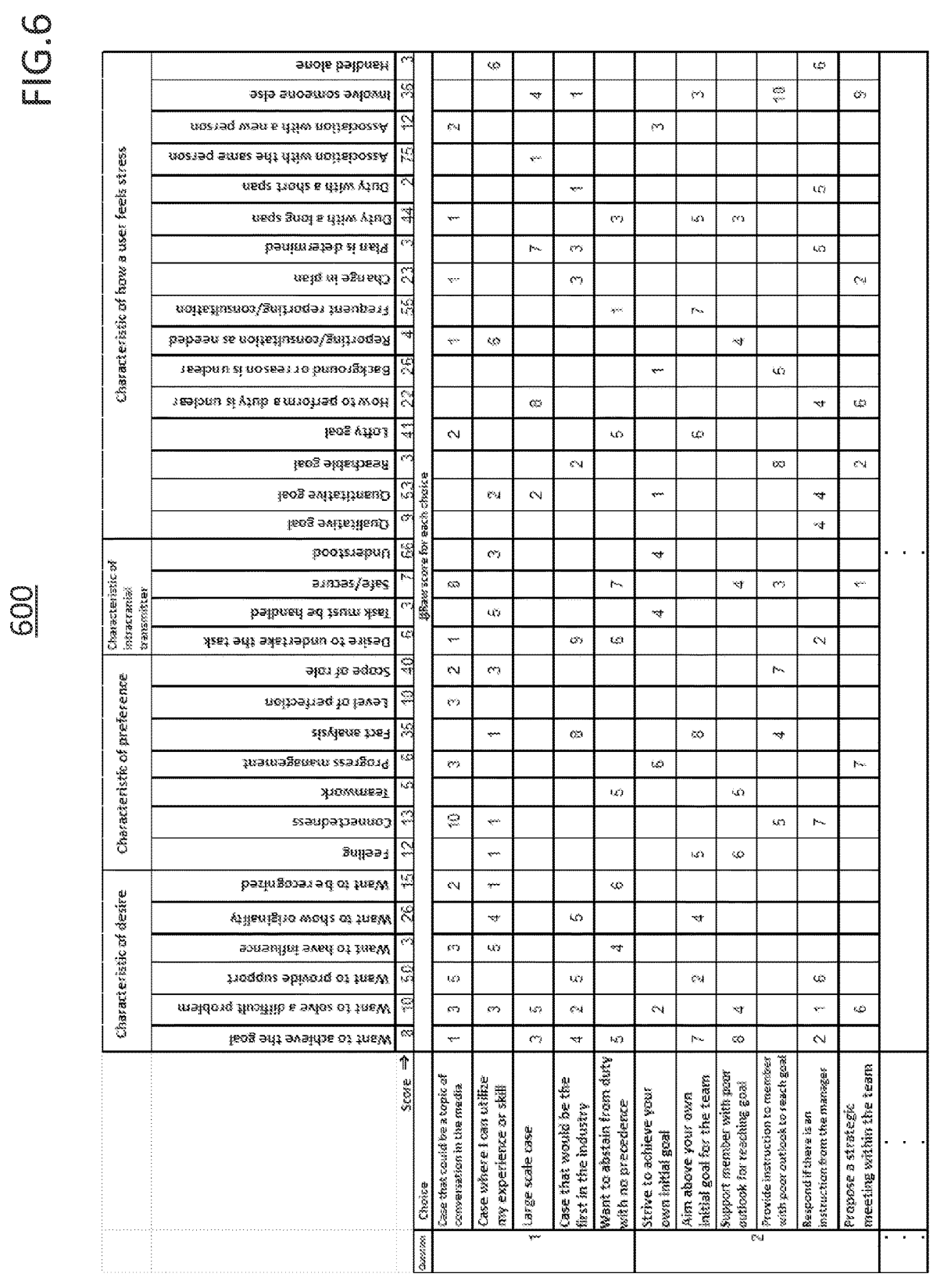

FIG. 6 shows an example of a correspondence table 600 for determining a characteristic of a user.

The correspondence table 600 associates the choices for each question in the survey table 10 shown in FIG. 1A with characteristics of a user with respect to four viewpoints. Choices for each question are indicated in the vertical columns, and characteristics of a user with respect to four viewpoints are indicated in the horizontal rows.

Each of the four viewpoints is further divided into a plurality of items. For example, a characteristic of desire is further divided into 6 items such as "Want to achieve the goal" and "Want to solve a difficult problem". For example, a characteristic of preference is further divided into 7 items such as "Feeling" and "Connectedness". These items can correspond to, for example, items displayed on the second display section 22, the third display section 23, the fifth display section 25, and the sixth display section 26 in FIGS. 1B and 1C.

The correspondence table 600 is configured so that a raw score for each item is assigned to choices for each question, and raw scores are added for each item in accordance with a choice for each question. For example, if a user answers "Case that could be a topic of conversation in the media" to question 1, the raw score assigned to the choice "Case that could be a topic of conversation in the media" is added to each item. If a user answers "Propose a strategic meeting within the team" to question 2, the raw score assigned to the choice "Propose a strategic meeting within the team" is added to each item. In this manner, the score for an item is computed by adding raw scores assigned to response choices for all questions, and a characteristic of a user can be determined by the score distribution of each item. Scores can be computed more accurately with weightings that takes into consideration ease of gaining scores when adding raw scores. A raw score is assigned to each choice for each question while being associated with multiple items. This can reduce biased responses that are given by a user while being cognizant of a proper response or recommended response, so that a characteristic of the user can be determined with higher accuracy.

Assignment of raw scores in the correspondence table 600 can be changed for each organization or constant for each organization. The assignment can be configured to vary over time depending on the state of an organization or to remain constant. Raw scores should be assigned so that choices for a question suitably correlate with each item.

The example shown in FIG. 6 describes that choices for each question in the survey table 10 shown in FIG. 1A are associated with four viewpoints, but what is associated with four viewpoints is not limited to choices for each question. Anything can be associated with four viewpoints, as long as a user characteristic can be determined from data that can be inputted via the interface unit 110. For example, a movement of a user can be associated with four viewpoints. For example, a raw score for each item can be assigned to a specific remark, specific action, or the like of a user. This enables, for example, observing a user using a camera or a microphone, and adding a raw score assigned to a specific remark when the specific remark is recognized and adding a raw score assigned to a specific action when the specific action is recognized to compute a score for the item, so that a user characteristic can be determined by a score distribution of each item.

Referring again to FIG. 5, once the receiving means 121 receives characteristics of a plurality of users, the comparison means 124 of the processing unit 120 then compares characteristics of two of the plurality of users with each other at step S502. For example, the comparison means 124 compares the characteristics of two users with respect to at least four viewpoints, where the at least four viewpoints can be the same as or different from the at least four viewpoints of user characteristics determined by the determination means 123. Each of the at least four viewpoints can be further divided into a plurality of items.

For example, the comparison means 124 can be configured to compare two users with respect to each of the at least four viewpoints, or with respect to each of the plurality of items of each of the at least four viewpoints. Conversion of each of the plurality of items of each of the at least four viewpoints into a score, much like the case of determining a user characteristic using the correspondence table 600, can facilitate comparison because scores can be simply compared.

For example, the comparison means 124 can be configured to determine a viewpoint with the greatest difference between two users among at least four viewpoints as well as the degree of difference, or configured to determine an item with the greatest difference between two users among the plurality of items for each of the at least four viewpoints as well as the degree of difference. For example, the comparison means 124 can be configured to determine a viewpoint with a degree of difference exceeding a predetermined threshold value among the at least four viewpoints, or configured to determine a viewpoint with a degree of difference exceeding a predetermined threshold value among the plurality of items for at least one of the at least four viewpoints. The comparison means 124 can be configured to rank the at least four viewpoints in order of greatest difference or configured to rank a plurality of items for at least one of the at least four viewpoints in order of greatest difference. The comparison means 124 can be configured to determine a viewpoint with the greatest commonality between the two users among the at least four viewpoints as well as the degree of commonality, or configured to determine an item with the greatest commonality between the two users among a plurality of items for each of the at least four viewpoints as well as the degree of commonality. For example, the comparison means 124 can be configured to determine a viewpoint with a degree of commonality exceeding a predetermined threshold value among at least four viewpoints, or configured to determine a viewpoint with a degree of commonality exceeding a predetermined threshold value among a plurality of items for each of the at least four viewpoints. The comparison means 124 can be configured to rank at least four viewpoints in the order of greatest commonality, or configured to rank a plurality of items for at least one of the at least four viewpoints in the order of greatest commonality.

At step S503, the outputting means 122 of the processing unit 120 outputs an advice on communication between two users based on the comparison at step S502. The outputting means 122 refers to an advice stored in the database unit 200 and outputs an advice on communication between the two users. For example, the outputting means 122 can output an advice to an element that is external to the computer system 100 via the interface unit 110.

For example, the outputting means 122 obtains and outputs an advice associated with a viewpoint determined as having the greatest difference between two users or a viewpoint whose degree of difference is determined as exceeding a predetermined threshold value at step S502 from the database unit 200. For example, the outputting means 122 obtains and outputs an advice associated with an item determined to have the greatest difference between two users or an item whose degree of difference is determined as exceeding a predetermined threshold value at step S502 for at least one of the at least four viewpoints from the database unit 200. For example, the outputting means 122 obtains and outputs an advice associated with a viewpoint determined to have the greatest commonality between two users or a viewpoint whose degree of commonality is determined as exceeding a predetermined threshold value at step S502 from the database unit 200. For example, the outputting means 122 obtains and outputs an advice associated with an item determined to have the greatest commonality between two users or an item whose degree of commonality is determined as exceeding a predetermined threshold value at step S502 for at least one of the at least four viewpoints from the database unit 200.

For example, the outputting means 122 can be configured to obtain and output an advice associated with a combination of a plurality of viewpoints determined to have a significant difference between two users at step S502 or an advice associated with a combination of a plurality of items determined as having a significant difference between two users at step S502 from the database unit 200. For example, the outputting means 122 can be configured to obtain and output an advice associated with a combination of a plurality of viewpoints determined as having significant commonality between two users at step S502 or an advice associated with a combination of a plurality of items determined as having significant commonality between two users at step S502 from the database unit 200.

An advice outputted in this manner can be displayed, for example, on the first display section 31, or a fourth display section (not shown), of the result display screen shown in FIG. 1D. The result of comparison at step S502 can be displayed, for example, on the second display section 32, the third display section 33, or a fifth or sixth display section (not shown) of the result display screen 30 shown in FIG. 1D. A result of comparison at step S502 can be displayed by any expression method, e.g., a diagrammatical expression such as a radar chart, line graph, area graph, bar chart, or pie chart, text expression, or audio expression.

In this manner, comparing characteristics of two users and providing an advice based on the comparison enables the two users to communicate while being cognizant of the commonality or difference of each other. This makes communication between two users smooth, promotes cooperation by the two users, and leads to improved efficiency. This can also promote efficient management of an organization.

The above examples describe comparing characteristics of two users at step S502 and outputting an advice on communication between the two users at step S503, but the present invention is not limited thereto. For example, comparing characteristics of three or more users and outputting an advice on communication between the three or more users is also within the scope of the invention. For example, at step S502' instead of step S502, the comparison means 124 of the processing unit 120 can be configured to compare characteristics of an additional user among a plurality of users with characteristics of the two users with each other, and at step S503' instead of step S503, the outputting means 122 of the processing unit 120 can be configured to output an advice on communication between the two users and the additional use based on the comparison at step S502'. An advice outputted in this manner can be displayed, for example, on the first display section 41, or a fourth display section (not shown), of the result display screen 40 shown in FIG. 1E. The result of comparison at step S502' can be displayed, for example, on the second display section 42, the third display section 43, or a fifth or sixth display section (not shown) of the result display screen 40 shown in FIG.

1E. A result of comparison at step S502' can be displayed by any expression method, e.g., a diagrammatical expression such as a radar chart, line graph, area graph, bar chart, or pie chart, text expression, or audio expression.

Figure 7:
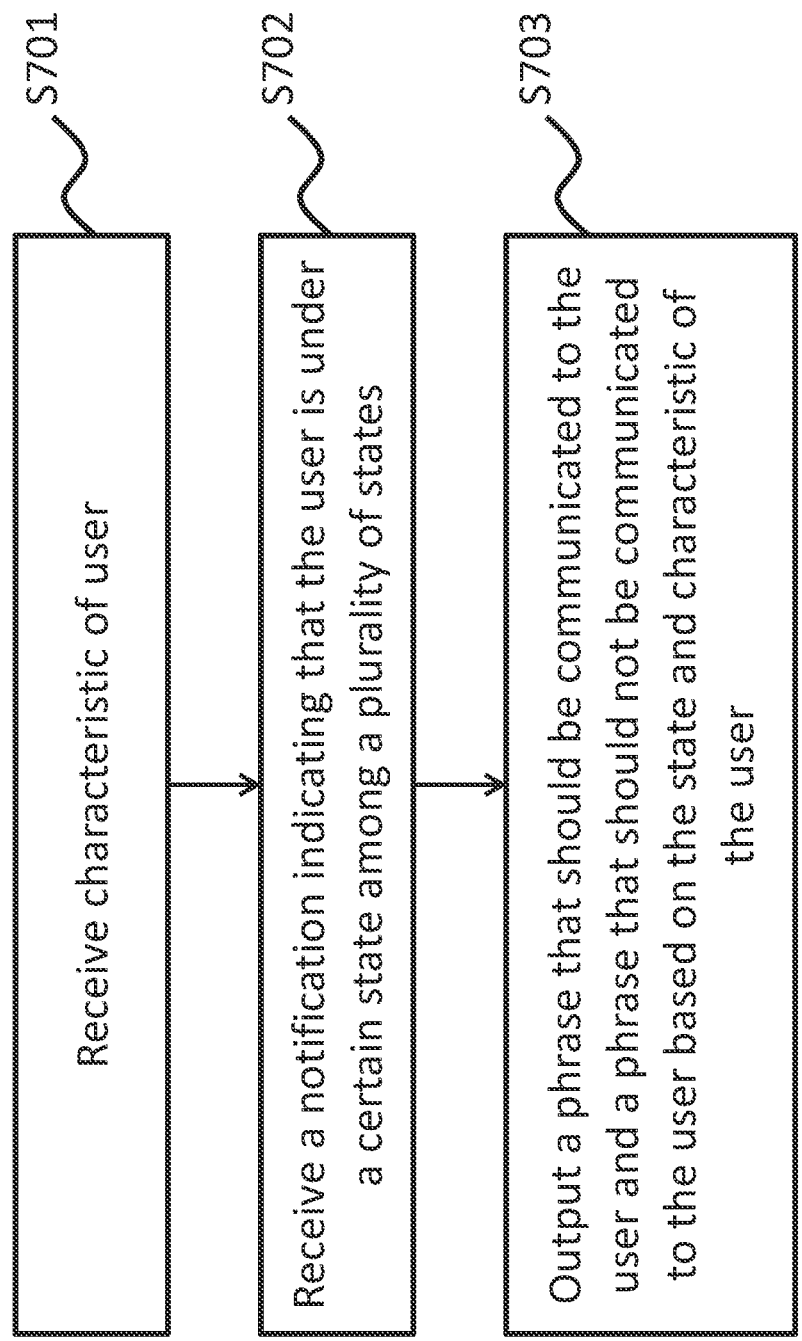
FIG. 7 is a flowchart showing an example of processing 700 performed in the computer system 100 for providing an advice on communication.

FIG. 7 shows an example of processing 700 performed in the computer system 100 for providing an advice on communication. The computer system 100 can provide an advice as to what type of communication should be established with a user in a specific state by performing the processing 700. An advice can be provided to, for example, a manager of an organization or the like.

At step S701, the receiving means 121 of the processing unit 120 receives a characteristic of a user. The receiving means 121 can receive a characteristic of a user inputted via the interface unit 110, or the receiving means 121 can receive a characteristic of a user determined by the determination means 123 based on data inputted via the interface unit 110. The processing at step S701 is the same as the processing at step S501.

When a report indicating that a user is in a certain state among a plurality of states is inputted into the computer system 100 via the interface unit 110, the receiving means 121 of the processing unit 120, at step S702, receives a notification indicating that the user is in a certain state among a plurality of states.

A report indicating that a user is in a certain state among a plurality of states can be inputted, for example, by selecting the selection button 52 on the report screen 50 shown in FIG. 2. As described in reference to FIG. 2, the report can be related to another member in the organization or the user themselves.

A notification indicating that a user is in a certain state among a plurality of states can comprise, for example, information on the state, information on the user who inputted the report (e.g., number of users or name of user), or the like.

At step S703, the outputting means 122 of the processing unit 120 outputs a phrase that should be communicated to a user and a phrase that should not be communicated to a user based on the state and characteristic of the user. The outputting means 122 refers to an advice stored in the database unit 200 and outputs a phrase that should be communicated to a user and a phrase that should not be communicated to a user. For example, the outputting means 122 can output a phrase that should be communicated to a user and a phrase that should not be communicated to a user to an element that is external to the computer system 100 via the interface unit 110.

For example, characteristics of a user are associated with each of a plurality of states, and an advice associated with characteristics of the user associated with the state of the user indicated by a notification received in step S502 is obtained from the database unit 200 and outputted as a phrase that should be communicated to a user and a phrase that should not be communicated to a user. If characteristics of a user are further divided into a plurality of items as described above, at least one of the plurality of items of the characteristics of the user can be associated with each of the plurality of states, and an advice associated with at least one of the plurality of items associated with a state of the user indicated by a notification received in step S502 is obtained from the database unit 200 and outputted as a phrase that should be communicated to a user and a phrase that should not be communicated to a user. It should be noted that two or more of the plurality of items of characteristics of a user are preferably associated with each of a plurality of states. This is because an advice associated with a combination of two or more items can be obtained, so that an advice that is a better match to the characteristics of a user can be provided.

For example, a state where a user is having trouble with handling a duty as planned can be associated with the item "Want to achieve the goal" of a characteristic of desire, the item "Progress management" of a characteristic of preference, the item "Degree of perfection" of a characteristic of preference, the item "Plan is determined" of a characteristic of how a user feels stress, or the item "Frequent reporting/consultation" of a characteristic of how a user feels stress among characteristics of the user. If the state of the user indicated by a notification received at step S502 is a state where the user is having trouble with handling a duty as planned, the item "Want to achieve the goal" of a characteristic of desire, the item "Progress management" of a characteristic of preference, the item "Degree of perfection" of a characteristic of preference, the item "Plan is determined" of a characteristic of how a user feels stress, or the item "Frequent reporting/consultation" of a characteristic of how a user feels stress among characteristics of the user can be referenced, and an advice associated with a value of each item can be obtained from the database unit 200 and outputted as a phrase that should be communicated to the user and a phrase that should not be communicated to the user.

An advice outputted in this manner can be displayed, for example, on the first phrase display section 62 and the second phrase display section 63 of the notification screen shown in FIG. 2B. User information indicated by a notification received at step S502 can be displayed, for example, on the reporter display section 61 of the notification screen 60 shown in FIG. 2B.

In this manner, an advice as to what type of communication should be established with a user in a specific state can be provided by providing an advice based on the state the user is in and characteristic of the user. This enables a manager of an organization to establish suitable communication with a member of the organization by receiving an advice based on objective analysis instead of an indefinite variable element such as a rule of thumb, feeling, or subjective understanding. This makes communication between a manager of an organization and a member of the organization smooth, promotes cooperation by members of the organization, and leads to improved efficiency. This can also promote efficient management of an organization.

The processing 700 was described as performing step S702 after step S701, but the order of step S701 and step S702 is not limited thereto. Step S701 can be configured to be performed after step S702.

The above examples describe that two types of phrases, i.e., a phase that should be communicated to a user and a phrase that should not be communicated to a user, are outputted at step S703, but the present invention is not limited thereto. The processing can be configured to output another phrase in addition to these phrases, or to output these phrases after further division. For example, the processing can be configured to output a phrase that must be communicated to a user and a phrase that cannot be communicated to a user at step S703. For example, the processing can be configured to output a phrase that should be communicated to a user so that the user can become a positive contributor, a phrase that should be communicated to a user so that the user can work while minimizing stress, a phrase that should not be communicated so that the user can become a positive contributor, or a phrase that should not be communicated to a user so that the user can work while minimizing stress at step S703.

Figure 8:
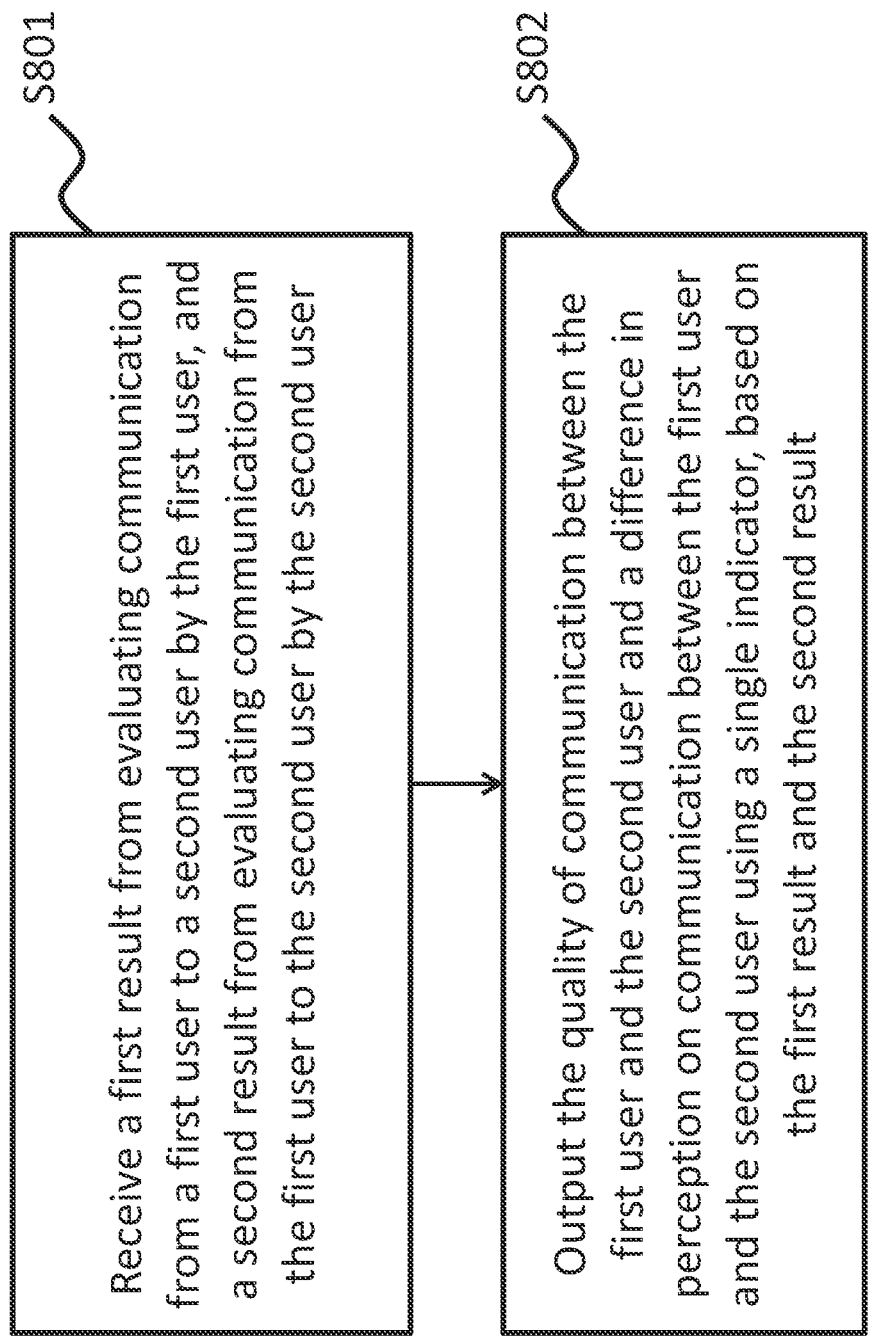
FIG. 8 is a flowchart showing an example of processing 800 performed in the computer system 100 for evaluating communication.

FIG. 8 shows an example of processing 800 performed in the computer system 100 for evaluating communication. The computer system 100 can evaluate the quality of communication between users by the processing 800. A result of evaluation of the quality of communication can be provided to, for example, a manager of an organization.

At step S801, the receiving means 121 of the processing unit 120 receives a first result from evaluating communication from a first user to a second user by the first user, and a second result from evaluating communication from the first user to the second user by the second user. The receiving means 121 receives the first result and the second result inputted via the interface unit 110. For example, the first result can be inputted by selecting the evaluation selection button 72 on the evaluation screen 70-1 for the first user (user AAA) shown in FIG. 3A. For example, the second result can be inputted by selecting an evaluation selection button on an evaluation screen for the second user (user BBB) corresponding to the evaluation screen 70-2 shown in FIG. 3B.

When the first result and the second result are received, the outputting means 122 of the processing unit 120, at step S802, outputs the degree of achievement of communication between the first user and the second user and the difference in perception on the communication between the first user and the second user using a single indicator, based on the first result and the second user. For example, the outputting means 122 can output an indicator to an element external to the computer system 100 via the interface unit 110.

The outputting means 122 determines an indicator so that, for example, the indicator is higher for a higher first result or second result, and the indicator is higher for a smaller difference between the first result and the second result. This is because the degree of achievement of communication between the first user and the second user can be considered higher for a higher first result or second result, and the difference in perception on communication between the first user and the second user can be considered smaller for a smaller difference between the first result and the second result. The quality of communication can be considered higher for a higher degree of achievement of communication between the first user and the second user and a smaller difference in the perception on communication between the first user and the second user. For example, the outputting means can determine and output an indicator using a correspondence table associating the first result with the second result in the relationship described above.

FIG. 9 shows an example of a correspondence table 900 for determining an indicator.

The correspondence table 900 associates a first result with a second result. The vertical column shows the first result (result of evaluation by a first user), and the horizontal row shows the second result (result of evaluation by a second user). A value in the table indicates an indicator determined by the combination of the first result and the second result. The correspondence table 900 is configured so that the indicator is higher for a higher first result, the indicator is higher for a higher second result, and the indicator is higher for a smaller difference between the first result and the second result. The first result or second result being 0 indicates that there was no communication. Since such communication is not worthy of evaluation, an indicator is intentionally low. Both the first result and the second result being 0 indicates that there was no communication. Since communication cannot be evaluated, the entry is left blank.

For example, if communication from the first user to the second user is evaluated by the first user as −1 among levels from −5 to +5 and the communication from the first user to the second user is evaluated by the second user as +4, the first result of −1 and the second result of +4 are received at step S801. At this time, the value corresponding to (first result, second result)=(−1, +4) is 42 in the correspondence table 900. Thus, the indicator is determined and outputted as 42.

An indicator outputted in this manner can be displayed, for example, on the first display section 81 of the result display screen 80 shown in FIG. 3C. The indicator can represent the quality of communication from the first user to the second user.

The above examples describe that an indicator is outputted based on a result of evaluation on communication from a first user to a second user by the first user or the second user, but the processing can be configured to output an indicator based on a result of evaluation of communication from the second user to the first user by the first user or the second user in addition to the result of evaluation of communication from the first user to the second user by the first user or the second user. Since an indicator would be outputted based on evaluation of communication in both directions, the accuracy of the outputted indicator can be improved.

In such a case, a third result from evaluating communication from the second user to the first user by the second user and a fourth result from evaluating communication from the second user to the first user by the first user are received in addition to receiving the first result and the second result in step S801' instead of step S801. The receiving means 121 receives the third result and the fourth result inputted via the interface unit 110. For example, the third result can be inputted by selecting an evaluation selection button for a second user (user BBB) corresponding to the evaluation screen 70-1 shown in FIG. 3A. For example, the fourth result can be inputted by selecting the evaluation selection button 74 on the evaluation screen 70-2 shown in FIG. 3B.

If the third result and the fourth result are received in addition to the first result and the second result, the outputting means 122 of the processing unit 120 outputs the degree of achievement of communication between the first user and the second user and a difference in perception on the communication between the first user and the second user using a single indicator based on the first result, second result, third result, and fourth result at step S802' instead of step S802. For example, the outputting means 122 can output an indicator to an element that is external to the computer system 100 via the interface unit 110. The outputting means 122 can determine and output an indicator using, for example, the correspondence table 900 described above.

For example, if communication from the first user to the second user is evaluated by the first user as −3 among levels from −5 to +5 and the communication from the first user to the second user is evaluated by the second user as −2, and communication from the second user to the first user is evaluated by the second user as +2 and the communication from the second user to the first user is evaluated by the first user as +1, the first result of −3, the second result of −2, the third result of +2, and the fourth result of +1 are received at step S801'. At this time, the value corresponding to (first result, second result)=(−3, −2) is 43 in the correspondence table 900. Thus, a first indicator based on the first result and the second result is determined as 43. The value corresponding to (third result, fourth result)=(+2, +1) is 68 in the correspondence table 900. Thus, a second indicator based on the third result and the fourth result is determined as 68.

The outputting means 122 determines an indicator based on the determined first indicator and the second indicator. For example, the outputting means 122 can be configured to determine an indicator by averaging the first indicator and the second indicator. Alternatively, the outputting means 122 can be configured to determine the first indicator or the second indicator, whichever is greater or lesser, as an indicator. For example, the outputting means 122 can determine the indicator as 56 by averaging the first indicator 43 and the second indicator 68, or determine the indicator as 43 or 68 in the above examples.

An indicator outputted in this manner can represent the quality of communication between the first user and the second user, and can be displayed, for example, on the first display section 81 of the result display screen 80 shown in FIG. 3C. The quality of communication of a user is the average of the indicators with each user. The indicator can be displayed on the second display section 82 of the result display screen 80 shown in FIG. 3C.

The above examples describe outputting an indicator representing the quality of communication between a first user and a second user, but an indicator representing the quality of communication between other members in the organization can be outputted by evaluation of communication by other members in the organization and processing of the evaluation result.

Outputting the quality of communication between users in an organization using a single indicator can eliminate the need for judgment that takes into consideration a plurality of results, so that communication between who and who within the organization is not going well can be readily found. Outputting the quality of communication between users using a single indicator and as a score can facilitate computation of the score for the entire team, comparison of scores between members, comparison of scores between a member and a manager, and relative comparison with another team. This allows a manager of an organization to readily be aware of the status of the organization, so that measures can be taken such as preferentially providing an advice to a person who is not communicating well. This can also promote efficient management of an organization.

At least two of the processing 500, 700, and 800 described above can be performed independently from each other, in parallel, or sequentially. If, for example, the processing 500 and 700 are performed in parallel or sequentially, step S501 and step S701 can be combined and performed as a single step.

If, for example, the processing 500 or 700 and processing 800 are performed in parallel or sequentially, the optimal combination of members in the organization can be derived based on characteristics of a user received at step S501 or step S701 of the processing 500 or 700 and an indicator outputted by step S802 of the processing 800. For example, when team members are determined to form a team, a combination of members having greater commonality in characteristics of each member and resulting in a higher indicator between each member can be derived by regression analysis or the like. For example, when determining a manager of a team, a member having greater commonality in characteristics with other members of the team and resulting in a higher indicator with other members of the team can be derived by regression analysis or the like. For example, when a member is to be transferred in under a certain manager, a member having greater commonality in characteristics with the manager and resulting in a higher indicator with the manager can be derived by regression analysis or the like.

In this manner, results from the processing 500, 700, and 800 can be applied to suitable organizational structuring.

The examples described above with reference to FIGS. 5, 7, and 8 describe that processing at each step shown in FIGS. 5, 7, and 8 is materialized by the processing unit 120 and a program stored in the memory unit 130, but the present invention is not limited thereto. At least one of the processing at each step shown in FIGS. 5, 7, and 8 can be materialized by a hardware configuration such as a control circuit.

The present invention is not limited to the aforementioned embodiments. It is understood that the scope of the present invention should be interpreted solely from the scope of the claims. It is understood that those skilled in the art can implement an equivalent scope, based on the descriptions of the invention and common general knowledge, from the descriptions of the specific preferred embodiments of the invention.

INDUSTRIAL APPLICABILITY

The present invention is useful as an invention providing a computer system, program, or method for providing an advice on communication, which is capable of making improvements to shortcomings in communication, as well as an invention providing a computer system, program, or method for evaluating communication between members with a readily understandable indicator.

REFERENCE SIGNS LIST

10 Survey table
20-1, 20-2 Result display screen
30 Result display screen
40 Result display screen
50 Report screen
60 Notification screen
70-1, 70-2 Evaluation screen
80 Result display screen
100 Computer system
110 Interface unit
120 Processing unit
121 Receiving mean
122 Outputting means
123 Determination means
124 Comparison means
130 Memory unit
200 Database unit

The invention claimed is:

1. A computer system for evaluating communication, the computer system comprising:
a processor unit configured to perform steps of:
receiving a first result from evaluating communication from a first user to a second user by the first user, and a second result from evaluating communication from the first user to the second user by the second user;
receiving a third result from evaluating communication from the second user to the first user by the second user, and a fourth result from evaluating communication from the second user to the first user by the first user;
determining a single indicator indicating both a degree of achievement of communication between the first user and the second user, and a difference in perception on communication between the first user and the second user, based on the first result, the second result, the third result and the fourth result;

transferring the first user to a first team and automatically updating a role of the first user in the computer system to one in the first team and transferring the second user to a second team different from the first team and automatically updating a role of the second user in the computer system to one in the second team based at least in part on the determined single indicator.

2. The computer system of claim 1, wherein determining the single indicator comprises:

obtaining a first indicator based on the first result and the second result, obtaining a second indicator based on the third result and the fourth result, and determining the single indicator based on the first indicator and the second indicator.

3. The computer system of claim 2, wherein determining the single indicator comprises averaging the first indicator and the second indicator.

4. The computer system of claim 2, wherein determining the single indicator comprises obtaining the first indicator and the second indicator using a correspondence table associating the first result with the second result and associating the third result with the fourth result.

5. The computer system of claim 4, wherein determining the single indicator comprises determining a value in the correspondence table specified by a row corresponding to the first result and a column corresponding to the second result, as the first indicator, and determining a value in the correspondence table specified by a row corresponding to the third result and a column corresponding to the fourth result, as the second indicator.

6. The computer system of claim 4, wherein the correspondence table is configured so that the first indicator is higher for a higher first result or second result, and the first indicator is higher for a smaller difference between the first result and the second result.

7. The computer system of claim 1, further comprising a display unit comprising a first display section configured to display multiple indicators representing the quality of communication between the first user of a plurality of users and the other users of the plurality of users, and a second display section configured to display an overall quality of communication of the first user.

8. A program for evaluating communication stored on a non-transitory computer readable medium, wherein the program is executed in a computer system comprising a processing unit, and the program, when executed, causes the processing unit to perform processing comprising:

receiving a first result from evaluating communication from a first user to a second user by the first user, and a second result from evaluating communication from the first user to the second user by the second user;

receiving a third result from evaluating communication from the second user to the first user by the second user, and a fourth result from evaluating communication from the second user to the first user by the first user;

determining a single indicator indicating both a degree of achievement of communication between the first user and the second user, and a difference in perception on communication between the first user and the second user, based on the first result, the second result, the third result and the fourth result;

transferring the first user to a first team and automatically updating a role of the first user in the computer system to one in the first team and transferring the second user to a second team different from the first team and automatically updating a role of the second user in the computer system to one in the second team based at least in part on the determined single indicator.

9. The program of claim 8, wherein the computer system further comprises a display unit, the display unit comprising a first display section configured to display multiple indicators representing the quality of communication between the first user of a plurality of users and the other users of the plurality of users, and a second display section configured to display an overall quality of communication of the first user.

10. A method for providing an advice on communication, wherein the method is executed in a computer system comprising a processing unit, and the method comprises:

receiving, by the processing unit, a first result from evaluating communication from a first user to a second user by the first user, and a second result from evaluating communication from the first user to the second user by the second user;

receiving, by the processing unit, a third result from evaluating communication from the second user to the first user by the second user, and a fourth result from evaluating communication from the second user to the first user by the first user;

determining, by the processing unit, a single indicator indicating both a degree of achievement of communication between the first user and the second user, and a difference in perception on communication between the first user and the second user, based on the first result, the second result, the third result and the fourth result;

transferring, by the processing unit, the first user to a first team and automatically updating, by the processing unit, a role of the first user in the computer system to one in the first team and transferring, by the processing unit, the second user to a second team different from the first team and automatically updating, by the processing unit, a role of the second user in the computer system to one in the second team based at least in part on the determined single indicator.

11. The method of claim 10, wherein the computer system further comprises a display unit, the display unit comprising a first display section configured to display multiple indicators representing the quality of communication between the first user of a plurality of users and the other users of the plurality of users, and a second display section configured to display an overall quality of communication for the first user.

* * * * *